US011297630B2

(12) United States Patent
Shimezawa et al.

(10) Patent No.: US 11,297,630 B2
(45) Date of Patent: Apr. 5, 2022

(54) TRANSMISSION APPARATUS, RECEPTION APPARATUS, TRANSMISSION METHOD, RECEPTION METHOD, AND RECORDING MEDIUM

(71) Applicant: Sony Corporation, Tokyo (JP)

(72) Inventors: Kazuyuki Shimezawa, Kanagawa (JP); Naoki Kusashima, Kanagawa (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 16/619,959

(22) PCT Filed: May 8, 2018

(86) PCT No.: PCT/JP2018/017768
§ 371 (c)(1),
(2) Date: Dec. 6, 2019

(87) PCT Pub. No.: WO2018/230191
PCT Pub. Date: Dec. 20, 2018

(65) Prior Publication Data
US 2020/0146026 A1 May 7, 2020

(30) Foreign Application Priority Data

Jun. 15, 2017 (JP) .............................. JP2017-117361

(51) Int. Cl.
*H04W 4/00* (2018.01)
*H04W 72/12* (2009.01)
*H04L 1/08* (2006.01)

(52) U.S. Cl.
CPC ............... *H04W 72/12* (2013.01); *H04L 1/08* (2013.01)

(58) Field of Classification Search
CPC ..... H04W 80/04; H04W 88/06; H04W 88/08; H04W 28/04; H04W 72/04;
(Continued)

(56) References Cited

U.S. PATENT DOCUMENTS

2016/0044729 A1* 2/2016 Tu .................. H04W 72/02
370/329
2016/0219627 A1 7/2016 Au et al.
(Continued)

FOREIGN PATENT DOCUMENTS

RU 2117388 C1 8/1998
RU 2347906 C1 2/2009
(Continued)

OTHER PUBLICATIONS

International Search Report and Written Opinion dated Jul. 17, 2018 for PCT/JP2018/017768 filed on May 8, 2018, 10 pages including English Translation of the International Search Report.
(Continued)

*Primary Examiner* — Chuong T Ho
(74) *Attorney, Agent, or Firm* — Xsensus, LLP

(57) ABSTRACT

[Object]
To provide a grant-free transmission mechanism that ensures improved transmission efficiency of a system as a whole.
[Solving Means]
A transmission apparatus includes a setting section and a communication processing section. The setting section performs settings regarding a resource capable of grant-free transmission and a plurality of transmission patterns corresponding to predetermined pieces of information different from each other. The communication processing section sends data in a grant-free manner in the resource capable of grant-free transmission by using a transmission pattern selected from among the plurality of transmission patterns.

15 Claims, 17 Drawing Sheets

(58) Field of Classification Search
CPC . H04W 72/0446; H04W 72/12; H04W 72/02; H04W 74/08; H04L 5/0007; H04L 1/08
USPC .................................................. 370/329, 330
See application file for complete search history.

(56) References Cited

U.S. PATENT DOCUMENTS

| | | | | |
|---|---|---|---|---|
| 2017/0318598 | A1* | 11/2017 | Islam | H04W 72/04 |
| 2018/0123765 | A1* | 5/2018 | Cao | H04L 1/1893 |
| 2018/0139774 | A1* | 5/2018 | Ma | H04W 72/1289 |
| 2018/0167182 | A1* | 6/2018 | Cao | H04L 5/0007 |
| 2018/0176945 | A1* | 6/2018 | Cao | H04L 1/1822 |
| 2018/0270807 | A1* | 9/2018 | Salem | H04L 5/0048 |
| 2019/0074933 | A1* | 3/2019 | Ohta | H04L 1/1887 |
| 2019/0103942 | A1* | 4/2019 | Wu | H04L 5/0048 |

FOREIGN PATENT DOCUMENTS

| | | |
|---|---|---|
| RU | 2415466 C1 | 3/2011 |
| WO | WO-03088122 A1 | 10/2003 |
| WO | WO-2007109669 A2 | 9/2007 |
| WO | WO-2011038013 A2 | 3/2011 |

OTHER PUBLICATIONS

Mediatek Inc., "LLS results for RDMA, GOCA, RSMA and IDMA schemes", 3GPP TSG RAN WG1 Meeting No. 86, R1-167536, Gothenburg, Sweden, Aug. 22-26, 2016, 7 pages.

Ericsson, "Contention resolution for grant-free access", 3GPP TSG RAN WG1 AH_NR Meeting, R1-1700690, Spokane, Washington, US, Jan. 16-20, 2017, 4 pages.

Intel Corporation, "Uplink URLLC Transmission without Grant", 3GPP TSG RAN WG1 NR Ad-Hoc Meeting, R1-1701206, Spokane, USA, Jan. 16-20, 2017, 10 pages.

Institute for Information Industry, "On Uplink Grant Free Resource Configuration", 3GPP TSG-RAN WG1 Meeting No. 88bis, R1-1705785, Spokane, USA, Apr. 3-7, 2017, 4 pages.

Fujitsu, "Discussions on HARQ for grant-free transmission", 3GPP TSG RAN WG1 Meeting No. 89, R1-1707258, Hangzhou, P.R. China, May 15-19, 2017, 5 pages.

Ericsson, "Beam failure recovery mechanism", 3GPP TSG-RAN WG1 No. 89, R1-1708678, Hangzhou, China, May 15-19, 2017, 8 pages.

Huawei, et al., "Grant-free transmission for UL URLLC", 3GPP TSG RAN WG1 Meeting No. 88b, R1-1704222, Spokane, USA, Apr. 3-7, 2017, 7 pages.

3GPP, "Technical Specification Group Radio Access Network; Study on Scenarios and Requirements for Next Generation Access Technologies", Release 14, 3GPP TR 38.913 V14.2.0, Mar. 2017, 38 pages.

Extended European Search Report dated May 27, 2020, issued in corresponding European Patent Application No. 18817202.7.

* cited by examiner

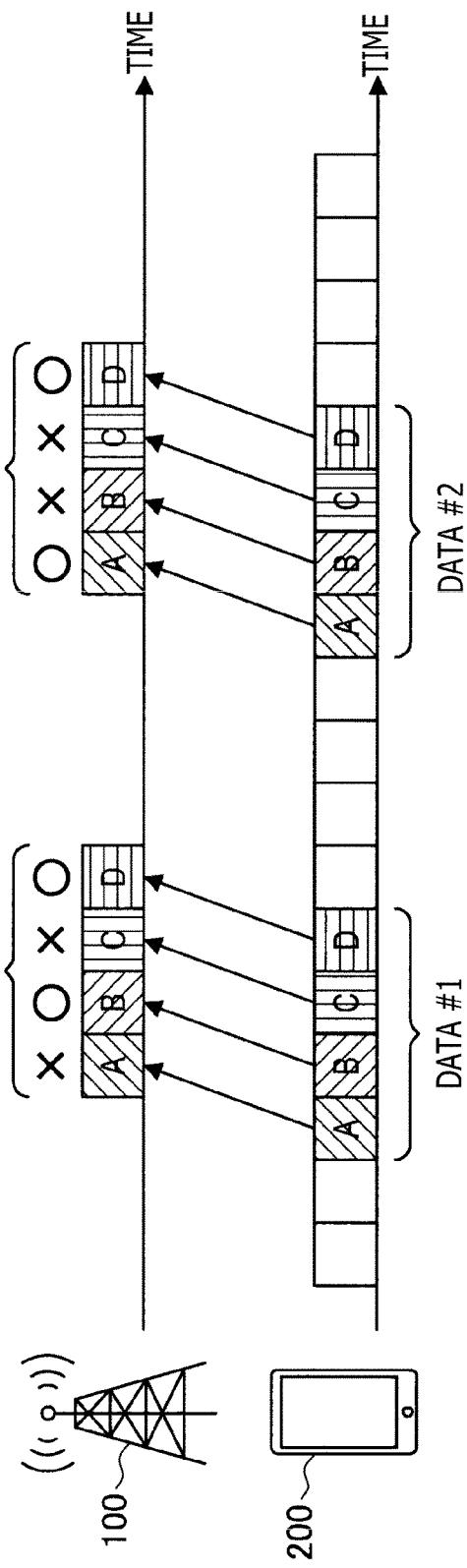
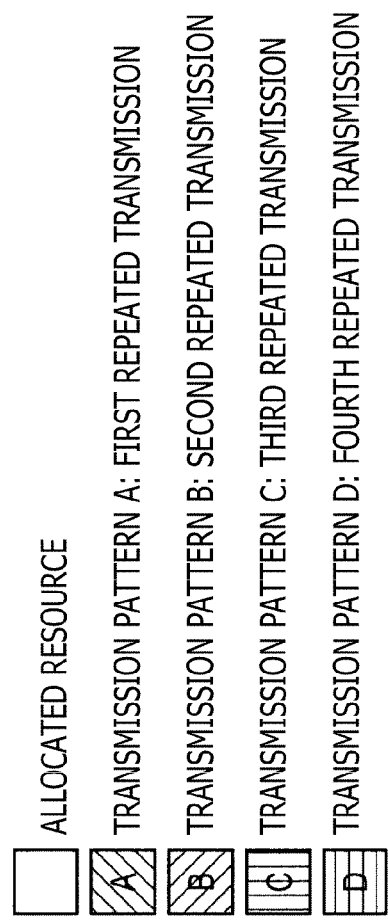
FIG. 9

TRANSMISSION APPARATUS, RECEPTION APPARATUS, TRANSMISSION METHOD, RECEPTION METHOD, AND RECORDING MEDIUM

CROSS-REFERENCE TO RELATED APPLICATIONS

The present application is based on PCT filing PCT/JP2018/017768, filed May 8, 2018, which claims priority to JP 2017-117361, filed Jun. 15, 2017, the entire contents of each are incorporated herein by reference.

TECHNICAL FIELD

The present disclosure relates to a transmission apparatus, a reception apparatus, a transmission method, a reception method, and recording media.

BACKGROUND ART

Wireless access scheme and wireless network for cellular mobile communication (hereinafter also referred to as "Long Term Evolution (LTE)," "LTE-Advanced (LTE-A)," "LTE-Advanced Pro (LTE-A Pro)," "5G (Fifth Generation)," "New Radio (NR)," "New Radio Access Technology (NRAT)," "Evolved Universal Terrestrial Radio Access (EUTRA)," or "Further EUTRA (FEUTRA)") have been under study by the third generation partnership project (3rd Generation Partnership Project: 3GPP). It should be noted that, in the description given below, LTE includes LTE-A, LTE-A Pro, and EUTRA, and NR includes NRAT and FEUTRA. In LTE and NR, a base station apparatus (base station) is also referred to as an eNodeB (evolved NodeB) in LTE and a gNodeB in NR, and a terminal apparatus (mobile station, mobile station apparatus, and terminal) is also referred to as UE (User Equipment). LTE and NR are cellular communication systems in which a plurality of areas covered by a base station apparatus is arranged in a cellular manner. A single base station apparatus may manage a plurality of cells.

NR is a RAT (Radio Access Technology) different from LTE as a next generation of wireless access scheme for LTE. NR is an access technology capable of dealing with various use cases including eMBB (Enhanced mobile broadband), mMTC (Massive machine type communications), and URLLC (Ultra reliable and low latency communications). NR is studied to build a technical framework for dealing with usage scenarios, requirements, arrangement scenarios, and so on in such use cases. Details of the NR scenarios and requirements are disclosed in NPL 1.

URLLC requires that low-latency transmission be realized. The reduction in latency by simplifying control required for data transmission in terminal apparatuses has been under study particularly in URLLC uplink transmission. In uplink transmission methods employed to date, in the case where uplink data occurs in a terminal apparatus, the terminal apparatus issues a request to a base station to allocate a resource for uplink transmission first, and then the base station notifies control information (uplink grant and uplink allocation) to the terminal apparatus to allocate a resource for uplink transmission. The terminal apparatus carries out uplink transmission using the allocated resource. Such control steps are performed each time uplink transmission takes place, thus resulting in latency.

For this reason, a resource is allocated for uplink transmission in advance, and in the case where data occurs in the terminal apparatus, the terminal apparatus carries out uplink transmission by using the resource capable of transmission that has been allocated in advance. This contributes to reduced time from the occurrence of data to the transmission thereof, thus realizing low-latency transmission. Such transmission is called grant-free transmission. Details of grant-free transmission are disclosed in NPL 2.

In NR, a plurality of transmission methods has been under study in uplink transmission. For example, these transmission methods include grant-based transmission (transmission with grant) and grant-free transmission (transmission with no grant). Here, grant refers to control information regarding uplink transmission and is also called uplink grant. Grant includes scheduling information such as resource allocation information regarding uplink transmission.

In grant-based transmission, the base station sends control information using PDCCH (Physical Downlink Control Channel) signaling, and the terminal apparatus carries out uplink transmission on the basis of the control information.

In grant-free transmission, a predetermined uplink resource (resource capable of grant-free transmission) for grant-free transmission is allocated to the terminal apparatus by the base station. In the case where uplink transmission data occurs, the terminal apparatus sends the data by using a predetermined resource from among resources capable of grant-free transmission. Communication for uplink transmission can be realized with lower latency than in grant-based transmission by allocating a resource capable of grant-free transmission to the terminal apparatus. It should be noted that grant-free transmission is applicable not only to low-latency communication use cases (e.g., URLLC) but also other use cases (e.g., eMBB and mMTC) from the viewpoint of reducing control burdens regarding grant transmission and so on. Also, a resource capable of grant-free transmission is set through RRC (Radio Resource Control) signaling as information specific to the terminal apparatus or the base station. A resource capable of grant-free transmission is given in a time direction by a periodic resource determined by a predetermined period and/or a predetermined offset, a continuous slot from a predetermined start position, and so on. Details of grant-free transmission are disclosed in NPL 2.

CITATION LIST

Non Patent Literature

[NPL 1]
3rd Generation Partnership Project; Technical Specification Group Radio Access Network; Study on Scenarios and Requirements for Next Generation Access Technologies; (Release 14), 3GPP TR 38.913 V14.2.0 (2017-03). Internet <URL:http://www.3gpp.org/ftp//Specs/archive/38 series/38. 913/38913-e20.zip>

[NPL 2]
R1-1704222, "Grant-free transmission for UL URLLC," Huawei, HiSilicon, 3GPP TSG RAN WG1 Meeting #88b, April 2017. Internet <URL:http://www.3gpp.org/ftp/ Meetings 3GPP SYNC/RAN1/Docs/R1-1704222.zip>

SUMMARY

Technical Problem

Not much time has elapsed since grant-free transmission was proposed, and there is room for improvement from various viewpoints. For example, one of the viewpoints that leaves room for improvement is transmission efficiency of a system as a whole that employs grant-free transmission.

For this reason, the present disclosure provides a grant-free transmission mechanism that ensures improved transmission efficiency of a system as a whole.

Solution to Problem

The present disclosure provides a transmission apparatus that includes a setting section and a communication processing section. The setting section performs settings regarding a resource capable of grant-free transmission and a plurality of transmission patterns corresponding to predetermined pieces of information different from each other. The communication processing section sends data in a grant-free manner in the resource capable of grant-free transmission by using a transmission pattern selected from among the plurality of transmission patterns.

Also, the present disclosure provides a reception apparatus that includes a setting section and a communication processing section. The setting section performs settings regarding a resource capable of grant-free transmission that is capable of being used by a transmission apparatus and a plurality of transmission patterns corresponding to predetermined pieces of information different from each other. The communication processing section acquires data sent by the transmission apparatus in a grant-free manner in the resource capable of grant-free transmission and a predetermined piece of information corresponding to a transmission pattern used for the data selected from among the plurality of transmission patterns.

Also, the present disclosure provides a transmission method carried out by a processor. The transmission method includes settings performed regarding a resource capable of grant-free transmission and a plurality of transmission patterns corresponding to predetermined pieces of information different from each other and grant-free transmission of data in the resource capable of grant-free transmission by using a transmission pattern selected from among the plurality of transmission patterns.

Also, the present disclosure provides a reception method carried out by a processor. The reception method includes settings performed regarding a resource capable of grant-free transmission that is capable of being used by a transmission apparatus and a plurality of transmission patterns corresponding to predetermined pieces of information different from each other and acquisition of data sent by the transmission apparatus in a grant-free manner in the resource capable of grant-free transmission and a predetermined piece of information corresponding to a transmission pattern used for the data selected from among the plurality of transmission patterns.

Also, the present disclosure provides a recording medium having a program recorded therein. The program causes a computer to function as a setting section and a communication processing section. The setting section performs settings regarding a resource capable of grant-free transmission and a plurality of transmission patterns corresponding to predetermined pieces of information different from each other. The communication processing section sends data in a grant-free manner in the resource capable of grant-free transmission by using a transmission pattern selected from among the plurality of transmission patterns.

Also, the present disclosure provides a recording medium having a program recorded therein. The program causes a computer to function as a setting section and a communication processing section. The setting section performs settings regarding a resource capable of grant-free transmission that may be used by a transmission apparatus and a plurality of transmission patterns corresponding to predetermined pieces of information different from each other. The communication processing section acquires data sent by the transmission apparatus in a grant-free manner in the resource capable of grant-free transmission and a predetermined piece of information corresponding to a transmission pattern used for the data selected from among the plurality of transmission patterns.

Advantageous Effect of Invention

As described above, the present disclosure provides a grant-free transmission mechanism that ensures improved transmission efficiency of a system as a whole. It should be noted that the above effect is not necessarily restrictive and that any of the effects pointed out in the present specification or other effect that can be grasped from the present specification may be brought about together with or in place of the above effect.

BRIEF DESCRIPTION OF DRAWINGS

FIG. 9 is a diagram for describing an example of information corresponding to a transmission pattern according to the present embodiment.

DESCRIPTION OF EMBODIMENTS

Figure 1:
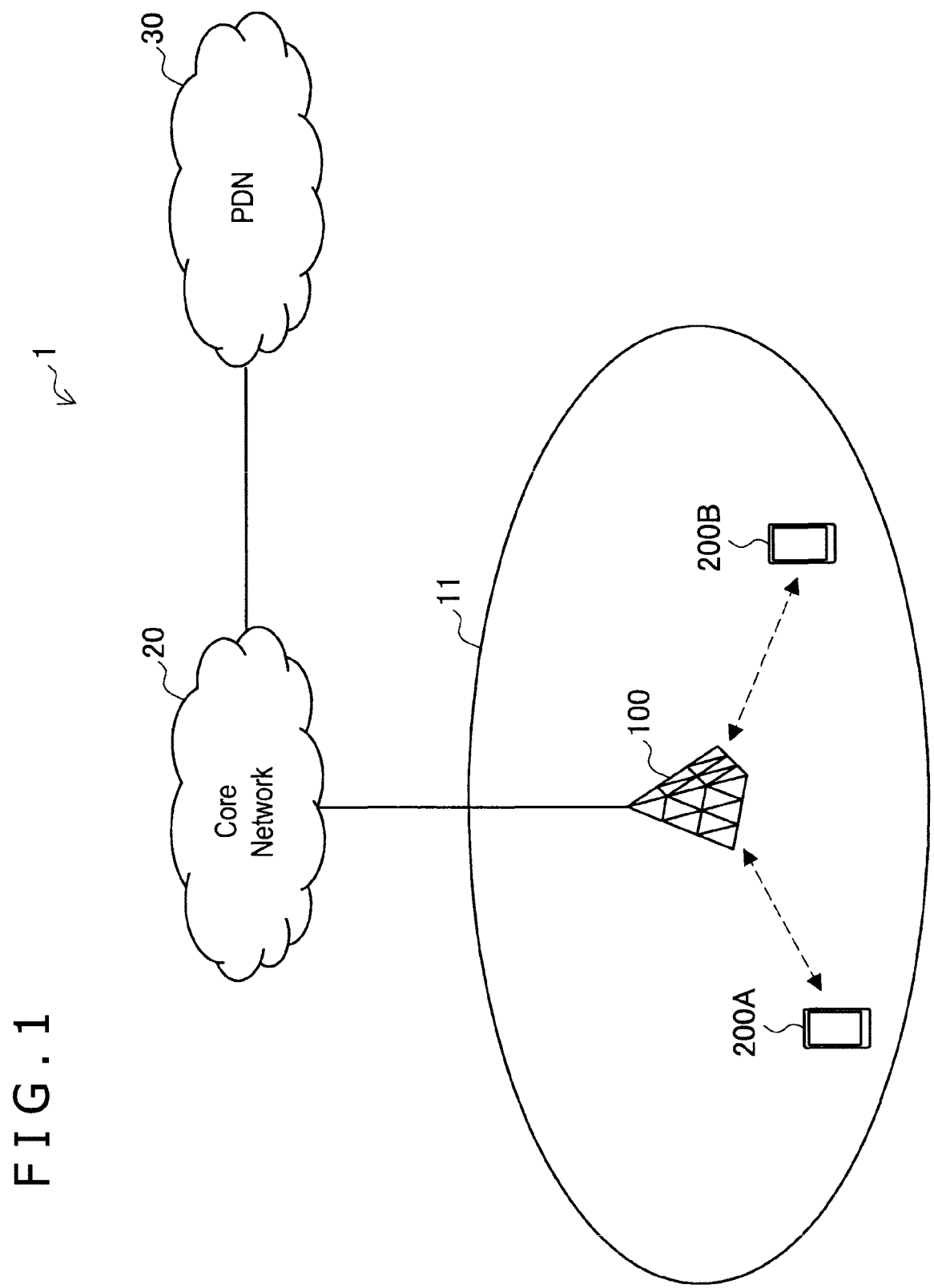
FIG. 1 is a diagram illustrating an overall configuration of a system as a whole according to an embodiment of the present disclosure.

A detailed description will be given below of a preferred embodiment of the present disclosure with reference to the attached drawings. It should be noted that the components having substantially the same functional configuration will be denoted by the same reference numerals and that redundant description thereof will be omitted.

Also, elements having substantially the same functional configuration may be distinguished one from the other in the present specification and the drawings by adding different alphabets after the same reference numeral. For example, a plural elements having substantially the same functional configuration are distinguished one from the other as terminal apparatuses 200A and 200B. It should be noted that in the case where there is no particular need to distinguish between a plurality of elements having substantially the same functional configuration, the plurality of elements will be denoted only by the same reference numeral. For example, in the case where there is no particular need to distinguish between the terminal apparatuses 200A and 200B, the terminal apparatuses will be simply referred to as the terminal apparatuses 200.

It should be noted that the description will be given in the following order:
1. Introduction
1.1 Overall configuration
1.2 Grant-based transmission and grant-free transmission
2. Configuration examples of respective apparatuses
2.1 Configuration example of base station apparatus
2.2 Configuration example of terminal apparatus
3. Technical features
3.1 Overview
3.2 Transmission patterns
3.3 Information corresponding to transmission patterns
3.4 Definitions of transmission patterns and transmission parameters
3.5 Processing flows
4. Application examples
5. Conclusion 1. Introduction 1.1 Overall Configuration FIG. 1 is a diagram illustrating an overall configuration of a system as a whole according to an embodiment of the present disclosure. As illustrated in FIG. 1, a system 1 includes a base station apparatus 100, a terminal apparatus 200A, a terminal apparatus 200B, a core network 20, and a PDN (Packet Data Network) 30.

The base station apparatus 100 is a communication apparatus that operates a cell 11 to provide wireless communication services to one or more terminal apparatuses located in the cell 11. The cell 11 is operated in accordance with an arbitrary wireless communication scheme such as LTE or NR. The base station apparatus 100 is connected to the core network 20. The core network 20 is connected to the PDN 30 via a gateway apparatus (not depicted).

The core network 20 can include, for example, an MME (Mobility Management Entity), an S-GW (Serving gateway), a P-GW (PDN gateway), a PCRF (Policy and Charging Rule Function), and an HSS (Home Subscriber Server). An MME is a control node that handles control plane signals and manages states of movement of the terminal apparatuses. An S-GW is a control node that handles user plane signals and switches between paths for transferring user data. A P-GW is a control node that handles user plane signals and plays a role of a connection point between the core network 20 and the PDN 30. A PCRF is a control node that performs control regarding policy and charging such as QoS (Quality of Service) for bearers. An HSS is a control node that handles subscriber data and controls services.

The terminal apparatus 200A and the terminal apparatus 200B are communication apparatuses that communicate wirelessly with the base station apparatus 100 under control of the base station apparatus 100. The terminal apparatus 200A and the terminal apparatus 200B may be so-called pieces of user equipment (UE). For example, the terminal apparatus 200A and the terminal apparatus 200B send an uplink signal to the base station apparatus 100 and receive a downlink signal from the base station apparatus 100.

Above all, the terminal apparatus 200A is a URLLC terminal that sends and receives URLLC signals to and from the base station apparatus 100. The URLLC terminal 200A corresponds to a first terminal apparatus that sends URLLC data (first uplink data) in a grant-free manner. The terminal apparatus 200B is an eMBB terminal that sends and receives eMBB signals to and from the base station apparatus 100. The eMBB terminal 200B corresponds to a second terminal apparatus that sends eMBB data (second uplink data) in a grant-based manner. In the case where there is no need to distinguish between the URLLC terminal 200A and the eMBB terminal 200B, these will be collectively referred to as the terminal apparatuses 200.

1.2 Grant-Based Transmission and Grant-Free Transmission

Grant-Based Transmission

The terminal apparatus 200 can carry out grant-based uplink transmission. Grant-based transmission refers to a transmission method in which a resource is allocated by the base station apparatus 100 each time data is to be sent occurs. To be specific, the base station apparatus 100 allocates an uplink resource for grant-based transmission (hereinafter also referred to as a grant-based transmission resource) to the terminal apparatus 200 when data to be sent occurs. Then, the terminal apparatus 200 sends data by using the allocated grant-based transmission resource.

Grant-based transmission resources are allocated dynamically by a control channel and so on.

A description will be given below of a flow of grant-based transmission with reference to FIG. 2.

Figure 2:
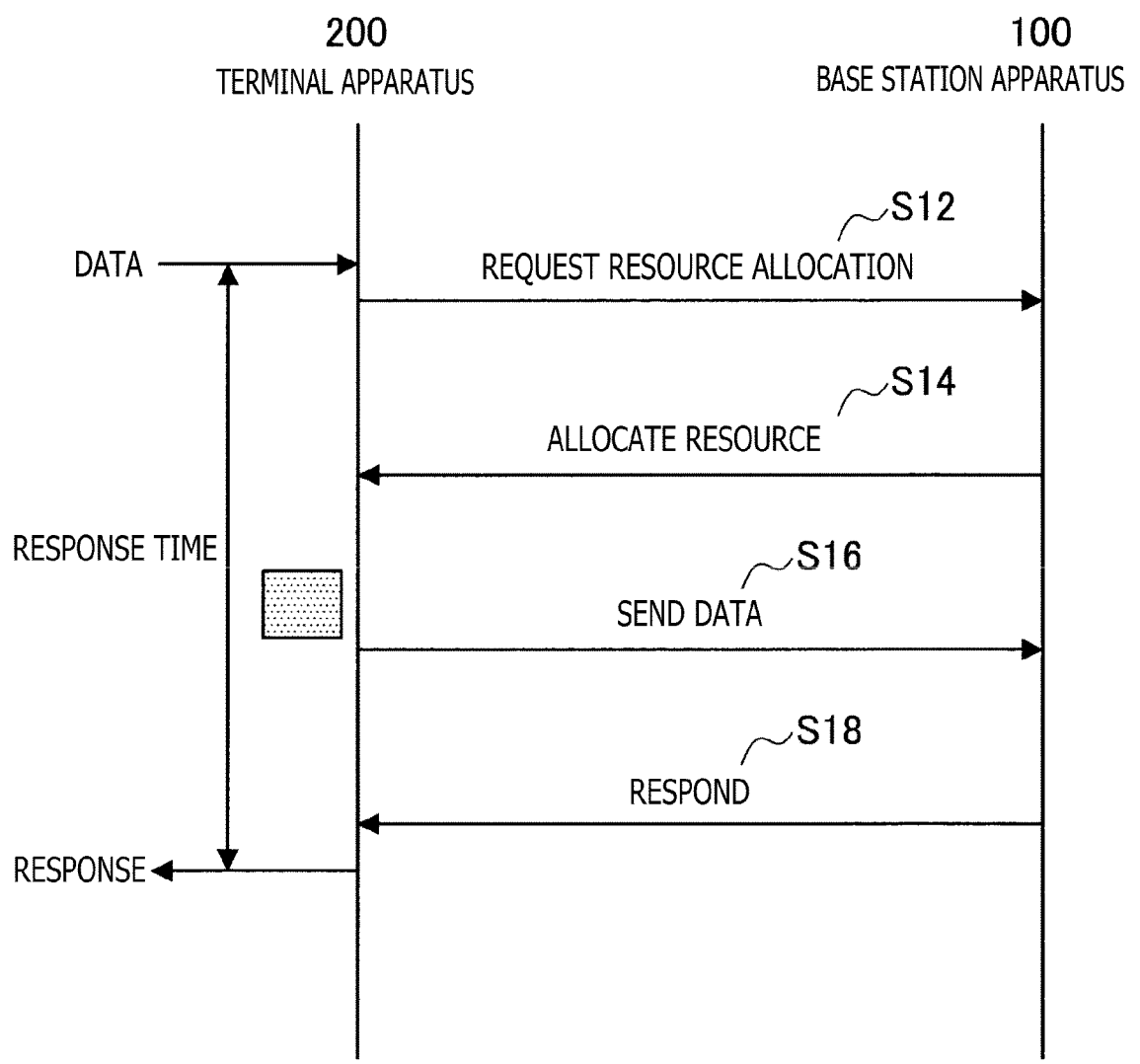
FIG. 2 is a sequence diagram illustrating an example of a flow of a grant-based transmission processing between a base station apparatus and a terminal apparatus according to the present embodiment.

FIG. 2 is a sequence diagram illustrating an example of a flow of grant-based transmission processing between the base station apparatus 100 and the terminal apparatus 200 according to the present embodiment. As illustrated in FIG. 2, when data to be sent occurs due, for example, to user input, the terminal apparatus 200 makes a request to the base station apparatus 100 to allocate a resource (step S12). Next, the base station apparatus 100 allocates a resource (step S14). Then, the terminal apparatus 200 sends data by using the resource allocated by the base station apparatus 100 in the above step S14 (step S16). Next, the base station apparatus 100 receives data and returns a response such as ACK/NACK to the terminal apparatus 200 (step S18). Next, the terminal apparatus 200 outputs the received response to the user and so on.

Grant-Free Transmission

The terminal apparatus 200 can carry out grant-free uplink transmission. Grant-free transmission refers to a transmission method in which a resource is allocated by the base station apparatus 100 in advance and in which data is sent by using the allocated resource in the case where data to be sent occurs. To be specific, the base station apparatus 100 allocates predetermined uplink resources (hereinafter also referred to as resources capable of grant-free transmission) to the terminal apparatus 200 for grant-free transmission. In the case where data to be sent uplink occurs, the terminal apparatus 200 selects a resource to be used for transmission from among the resources capable of grant-free transmission and sends data by using the selected resource.

A resource capable of grant-free transmission is set statically or quasi-statically through RRC signaling as information specific to the base station apparatus 100 or the terminal apparatus 200. A resource capable of grant-free transmission can be set by a periodic resource determined by a predetermined period and/or a predetermined offset, a continuous slot from a predetermined start position, and so on.

A description will be given below of an example of a flow of grant-free transmission with reference to FIG. 3.

Figure 3:
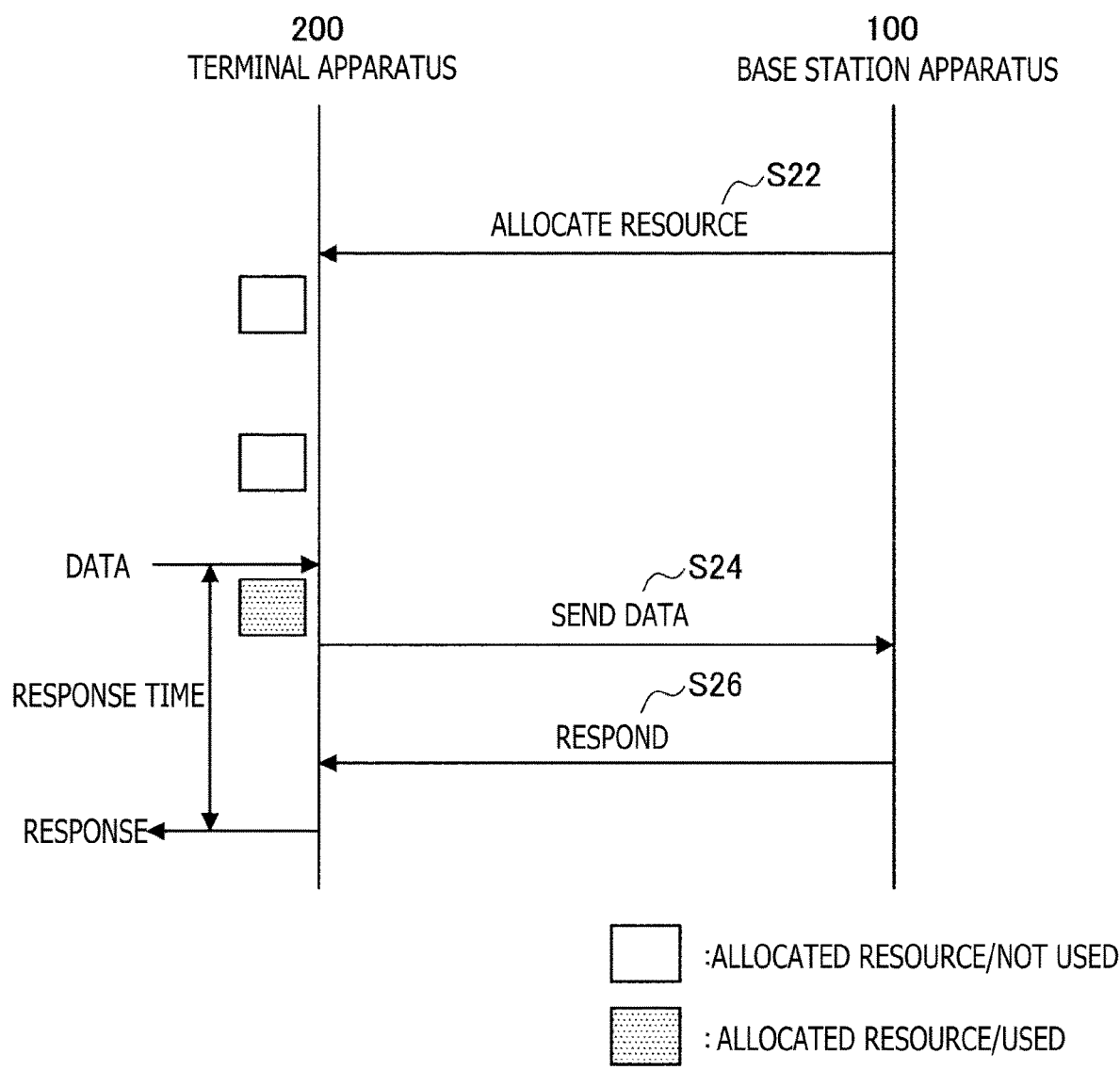
FIG. 3 is a sequence diagram illustrating an example of a flow of a grant-free transmission processing between a base station apparatus and a terminal apparatus according to the present embodiment.

FIG. 3 is a sequence diagram illustrating an example of a flow of grant-free transmission processing between the base station apparatus 100 and the terminal apparatus 200 according to the present embodiment. As illustrated in FIG. 3, the base station apparatus 100 allocates a resource first (step S22). The resource allocated here is a resource capable of grant-free transmission. The terminal apparatus 200 will not use the allocated resource capable of grant-free transmission until data to be sent occurs. If data to be sent occurs due, for example, to user input, the terminal apparatus 200 sends the data by using the allocated resource capable of grant-free transmission (step S24). Next, the base station apparatus 100 returns a response such as ACK/NACK to the base station apparatus 100 (step S26). Next, the base station apparatus 100 outputs the received response to the user and so on.

Comparison between FIGS. 2 and 3 indicates that a period of time from occurrence of data to be sent to completion of transmission or a response time until a response is acquired is shorter in grant-free transmission than in grant-based transmission. Therefore, grant-free transmission can realize low-latency transmission.

2. Configuration Examples of Respective Apparatuses

2.1 Configuration Example of Base Station Apparatus

Figure 4:
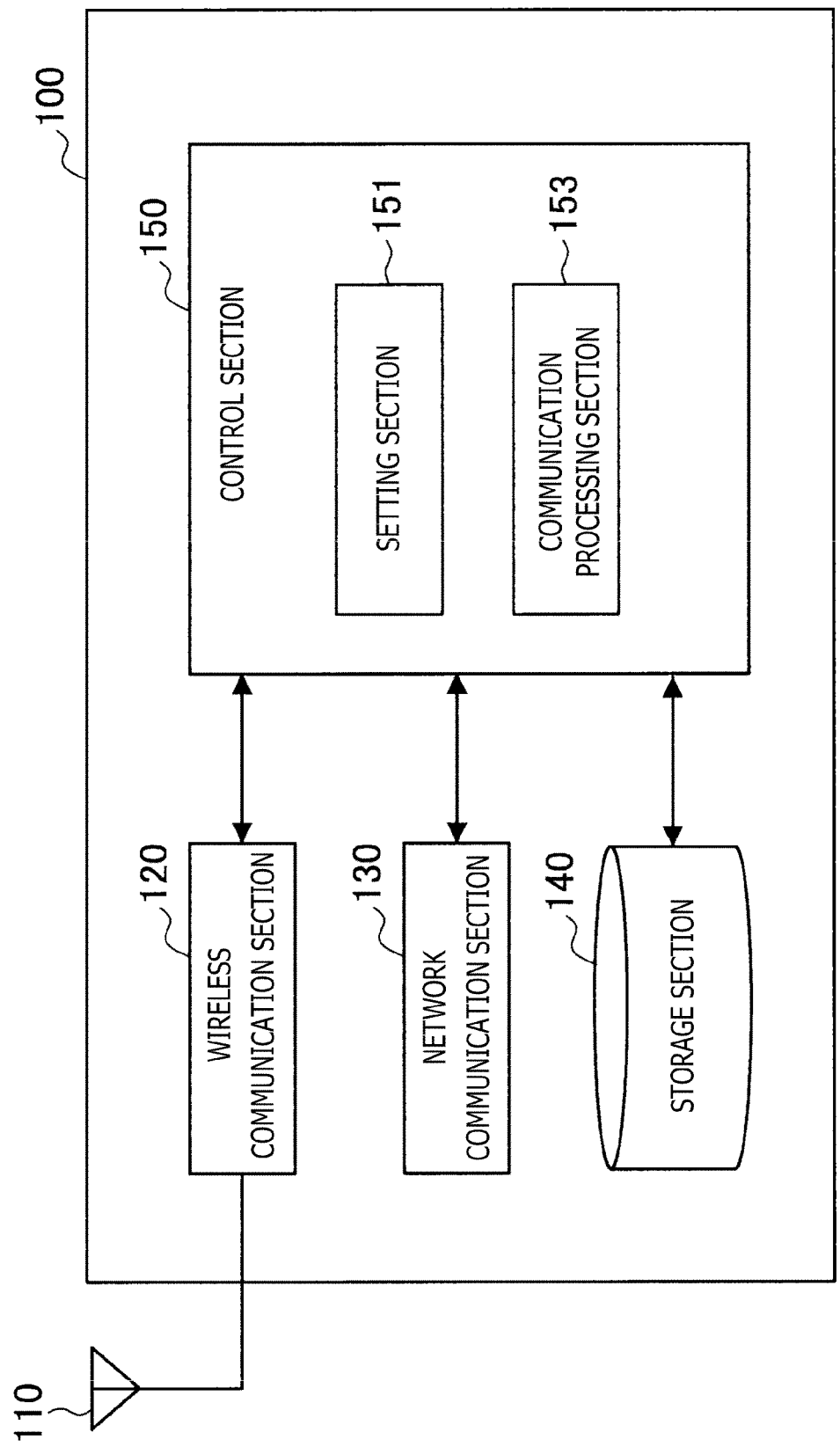
FIG. 4 is a block diagram illustrating a configuration example of the base station apparatus according to the present embodiment.

FIG. 4 is a block diagram illustrating a configuration example of the base station apparatus 100 according to the present embodiment. Referring to FIG. 4, the base station apparatus 100 includes an antenna section 110, a wireless communication section 120, a network communication section 130, a storage section 140, and a control section 150.

(1) Antenna Section 110

The antenna section 110 radiates a signal, output from the wireless communication section 120, into a space as radio waves. Also, the antenna section 110 converts radio waves in a space into a signal and outputs the signal to the wireless communication section 120.

(2) Wireless Communication Section 120

The wireless communication section 120 sends and receives signals. For example, the wireless communication section 120 sends a downlink signal to the terminal apparatus and receives an uplink signal from the terminal apparatus.

(3) Network Communication Section 130

The network communication section 130 sends and receives information. For example, the network communication section 130 sends information to other nodes and receives information from other nodes. For example, the other nodes include other base stations and core network nodes.

(4) Storage Section 140

The storage section 140 temporarily or permanently stores programs for operating the base station apparatus 100 and various pieces of data.

(5) Control Section 150

The control section 150 controls the operation of the base station apparatus 100 as a whole and provides a variety of functions of the base station apparatus 100. The control section 150 includes a setting section 151 and a communication processing section 153. The setting section 151 has functions to perform various settings associated with communication with the terminal apparatus 200 on the basis of the settings by the setting section 151. The communication processing section 153 has functions to perform transmission processing and reception processing associated with communication with the terminal apparatus 200. Detailed operation of each of the setting section 151 and the communication processing section 153 will be described in detail later. The control section 150 can include components other than these components. That is, the control section 150 can operate in manners other than those in which these components operate.

2.2 Configuration Example of Terminal Apparatus

Figure 5:
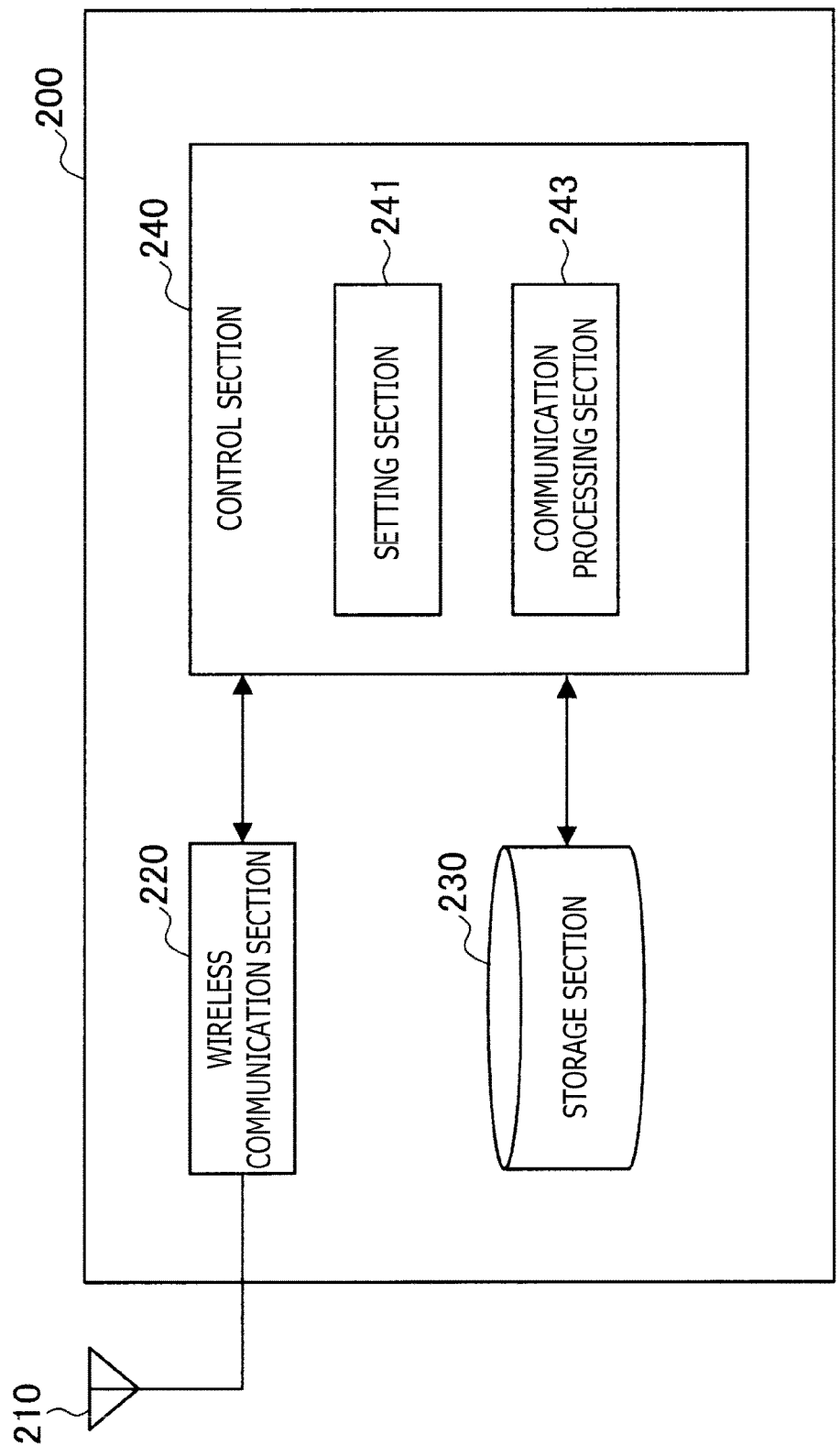
FIG. 5 is a block diagram illustrating a configuration example of the terminal apparatus according to the present embodiment.

FIG. 5 is a block diagram illustrating a configuration example of the terminal apparatus 200 according to the present embodiment. Referring to FIG. 5, the terminal apparatus 200 includes an antenna section 210, a wireless communication section 220, a storage section 230, and a control section 240.

(1) Antenna Section 210

The antenna section 210 radiates a signal, output from the wireless communication section 220, into a space as radio waves. Also, the antenna section 210 converts radio waves in a space into a signal and outputs the signal to the wireless communication section 220.

(2) Wireless Communication Section 220

The wireless communication section 220 sends and receives signals. For example, the wireless communication section 220 receives a downlink signal from the base station and sends an uplink signal to the base station.

(3) Storage Section 230

The storage section 230 temporarily or permanently stores programs for operating the terminal apparatus 200 and various pieces of data.

(4) Control Section 240

The control section 240 controls the operation of the terminal apparatus 200 as a whole and provides a variety of functions of the terminal apparatus 200. The control section 240 includes a setting section 241 and a communication processing section 243. The setting section 241 has functions to perform various settings associated with communication with the base station apparatus 100. The communication processing section 243 has functions to perform transmission processing and reception processing associated with communication with the base station apparatus 100 on the basis of the settings by the setting section 241. Detailed operation of each of the setting section 241 and the communication processing section 243 will be described in detail later. The control section 240 can include components other than these components. That is, the control section 240 can operate in manners other than those in which these components operate.

3. Technical Features

3.1 Overview

The transmission apparatus that sends data in a grant-free manner performs settings regarding a resource capable of grant-free transmission and a plurality of transmission patterns corresponding to predetermined pieces of information different from each other. Similarly, the reception apparatus that receives data in a grant-free manner performs settings regarding a resource capable of grant-free transmission that can be used by the transmission apparatus and a plurality of transmission patterns corresponding to predetermined pieces of information different from each other. To be specific, the transmission apparatus and the reception apparatus recognize the resource capable of grant-free transmission allocated to the transmission apparatus and sets correspondence between each of the plurality of transmission patterns and the predetermined information.

The transmission apparatus sends data in a grant-free manner by using a transmission pattern selected from among a plurality of transmission patterns set in a set resource capable of grant-free transmission. To be specific, the transmission apparatus selects a transmission pattern in accordance with a predetermined selection criterion in the resource capable of grant-free transmission and sends data by using the selected transmission pattern. The predetermined selection criterion may be construed as a criterion for selecting a transmission pattern or as a criterion for selecting which piece of information to send from among the plurality of pieces of information corresponding to the plurality of transmission patterns.

The reception apparatus acquires data sent in a grant-free manner by the transmission apparatus in a set resource capable of grant-free transmission and a predetermined piece of information corresponding to a transmission pattern selected from among a plurality of set transmission patterns in the set resource capable of grant-free transmission. To be specific, the reception apparatus receives data sent from the transmission apparatus in a resource capable of grant-free transmission, recognizes a transmission pattern used to send the received data, and acquires a piece of information corresponding to the transmission pattern. The reception of data and the acquisition of information corresponding to the transmission pattern may be conducted concurrently or at different times.

As described above, thanks to the selection of a transmission pattern, information corresponding to the selected transmission pattern is notified indirectly (i.e., implicitly) to the reception apparatus from the transmission apparatus. This notice can be made without consuming any physical resource, thus contributing to improved transmission efficiency.

In the current 5G discussion regarding grant-free transmission, the transmission pattern is limited to one type. In contrast, the transmission apparatus according to the present embodiment can select a transmission pattern for data transmission from among a plurality of transmission patterns. For this reason, it is possible to select a transmission pattern flexibly in accordance with an interference condition and so on as compared to the case in which the transmission pattern to be used is limited to one type, thus ensuring improved transmission efficiency.

An arbitrary communication apparatus can function as a transmission apparatus or a reception apparatus. In the present specification, a description will be given assuming that the terminal apparatus 200 is a transmission apparatus, the base station apparatus 100 is a reception apparatus, and uplink data is sent in a grant-free manner.

Settings regarding a resource capable of grant-free transmission and transmission patterns are performed under control of the base station apparatus 100. For example, the base station apparatus 100 (e.g., the setting section 151) allocates (i.e., sets) a resource capable of grant-free transmission to the terminal apparatus 200 and sets correspondence between each of a plurality of transmission patterns and a predetermined piece of information. Then, the base station apparatus 100 performs the above settings while notifying these pieces of setting information to the terminal apparatus 200. The terminal apparatus 200 (e.g., the setting section 241) performs the above settings on the basis of the notified setting information.

Settings regarding transmission patterns by the base station apparatus 100 are performed, for example, through RRC signaling. Settings regarding transmission patterns may be performed as part of a setting regarding a resource capable of grant-free transmission. That is, the base station apparatus 100 may cause the terminal apparatus 200 to perform settings by notifying setting information including a setting regarding grant-free transmission and settings regarding the transmission patterns to the terminal apparatus 200 through RRC signaling.

After performing the settings regarding a resource capable of grant-free transmission and transmission patterns, the terminal apparatus 200 (e.g., the communication processing section 243) sends data in a grant-free manner by using the transmission pattern selected from among the plurality of set transmission patterns in the set resource capable of grant-free transmission. The base station apparatus 100 (e.g., the communication processing section 153) acquires the data sent in a grant-free manner by the terminal apparatus 200 and the predetermined piece of information corresponding to the transmission pattern used for the data in question.

A description will be given below of an example of grant-free transmission carried out in the system 1 according to the present embodiment with reference to FIG. 6.

Figure 6:
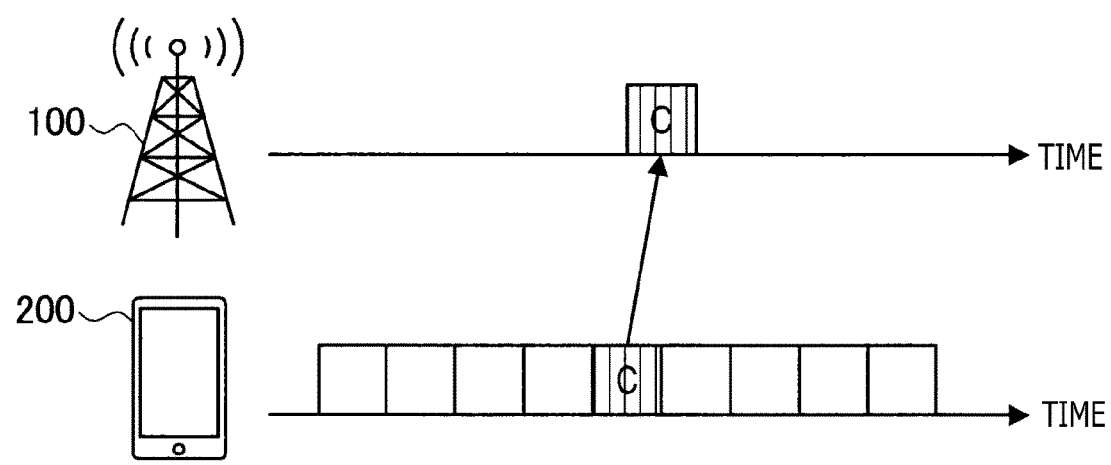
FIG. 6 is a diagram describing an example of grant-free transmission carried out in the system according to the present embodiment.

FIG. 6 is a diagram describing an example of grant-free transmission carried out in the system 1 according to the present embodiment. In the example illustrated in FIG. 6, four transmission patterns are set in the terminal apparatus 200 through RRC signaling sent from the base station apparatus 100. A transmission pattern A corresponds to a first piece of information, a transmission pattern B corresponds to a second piece of information, a transmission pattern C corresponds to a third piece of information, and a transmission pattern D corresponds to a fourth piece of information. In the case where uplink data to be sent in a grant-free manner occurs, the terminal apparatus 200 selects a transmission pattern in accordance with a predetermined selection criterion and sends the data by using the transmission pattern in question. In the example illustrated in FIG. 6, the terminal apparatus 200 sends data uplink by using the transmission pattern C in the resource capable of grant-free transmission. The base station apparatus 100 receives the data sent uplink from the terminal apparatus 200 and recognizes that the data in question has been sent by using the transmission pattern C, thus indirectly receiving a third piece of information.

It should be noted that although uplink transmission will be described in the present embodiment, the present technology is also applicable to downlink transmission. In that case, the base station apparatus 100 is a transmission apparatus, and the terminal apparatus 200 is a reception apparatus. Settings regarding a resource capable of grant-free transmission and transmission patterns in downlink transmission are performed under control of the base station apparatus 100 as in the case of uplink transmission. After performing the settings regarding a resource capable of grant-free transmission and transmission patterns, the base station apparatus 100 (e.g., the communication processing section 153) sends data in a grant-free manner by using the transmission pattern selected from among the plurality of set transmission patterns in the set resource capable of grant-free transmission. The terminal apparatus 200 (e.g., the communication processing section 243) acquires data sent by the base station apparatus 100 in a grant-free manner in the set resource capable of grant-free transmission and the predetermined piece of information corresponding to the transmission pattern used for the data in question.

Also, the present technology is applicable to sidelink transmission. In that case, the first terminal apparatus 200 is a transmission apparatus, and the second terminal apparatus 200 is a reception apparatus. Settings regarding a resource capable of grant-free transmission and transmission patterns in sidelink transmission are performed under control of the base station apparatus 100 as in the case of uplink transmission or downlink transmission. In this case, on the basis of the setting information received from the base station apparatus 100, the first terminal apparatus 200 and the second terminal apparatus 200 perform settings regarding a resource capable of grant-free transmission and transmission patterns. In addition to the above, settings regarding a resource capable of grant-free transmission and transmission patterns in sidelink transmission may be performed under control of the first terminal apparatus 200 or the second terminal apparatus 200. After performing the settings regarding a resource capable of grant-free transmission and transmission patterns, the first terminal apparatus 200 (e.g., the communication processing section 243) sends data in a grant-free manner by using the transmission pattern selected from among the plurality of set transmission patterns in the set resource capable of grant-free transmission. The second terminal apparatus 200 (e.g., the communication processing section 243) acquires data sent by the first terminal apparatus 200 (e.g., the communication processing section 243) in a grant-free manner in the set resource capable of grant-free transmission and the predetermined piece of information corresponding to the transmission pattern used for the data in question. It should be noted that sidelink transmission can be also referred to as D2D (Device to Device) transmission or V2X (Vehicle to X) transmission.

3.2 Transmission Patterns

A description will be given below of an example of a transmission pattern according to the present embodiment. It should be noted that a transmission pattern may be construed as a transmission index.

Non-Orthogonal Resource

The transmission pattern may relate to a non-orthogonal resource used for data transmission. To be specific, the transmission pattern may be a non-orthogonal resource pattern used for data transmission.

In orthogonal multiple access (OMA), transmission and reception are conducted by using, for example, a frequency axis and a time axis orthogonal to each other. At this time, a frame configuration of frequency and time resources is determined by a subcarrier interval, and the communication apparatus cannot use more resources than the number of resource elements. In non-orthogonal multiple access (NOMA), on the other hand, a frame configuration is determined by using not only the frequency axis and the time axis orthogonal to each other (orthogonal resources) but also non-orthogonal axes (non-orthogonal resources). Among examples of non-orthogonal resources are an interleave pattern, a spreading pattern, a scrambling pattern, a codebook, and power.

For example, a corresponding MA signature (Multiple Access signature) (non-orthogonal resource pattern) is applied to uplink transmission in each of the terminal apparatuses 200. Here, the MA signature includes, for example, an interleave pattern, a spreading pattern, a scrambling pattern, a codebook, power, and so on. An MA signature may be simply referred to as a pattern or an index. Alternatively, an MA signature may be an identifier or other information of a pattern or an index used in NOMA or what represents the pattern itself. A signal to which the MA signature has been applied is sent over the same frequency and time resources from the plurality of terminal apparatuses 200.

Figure 7:
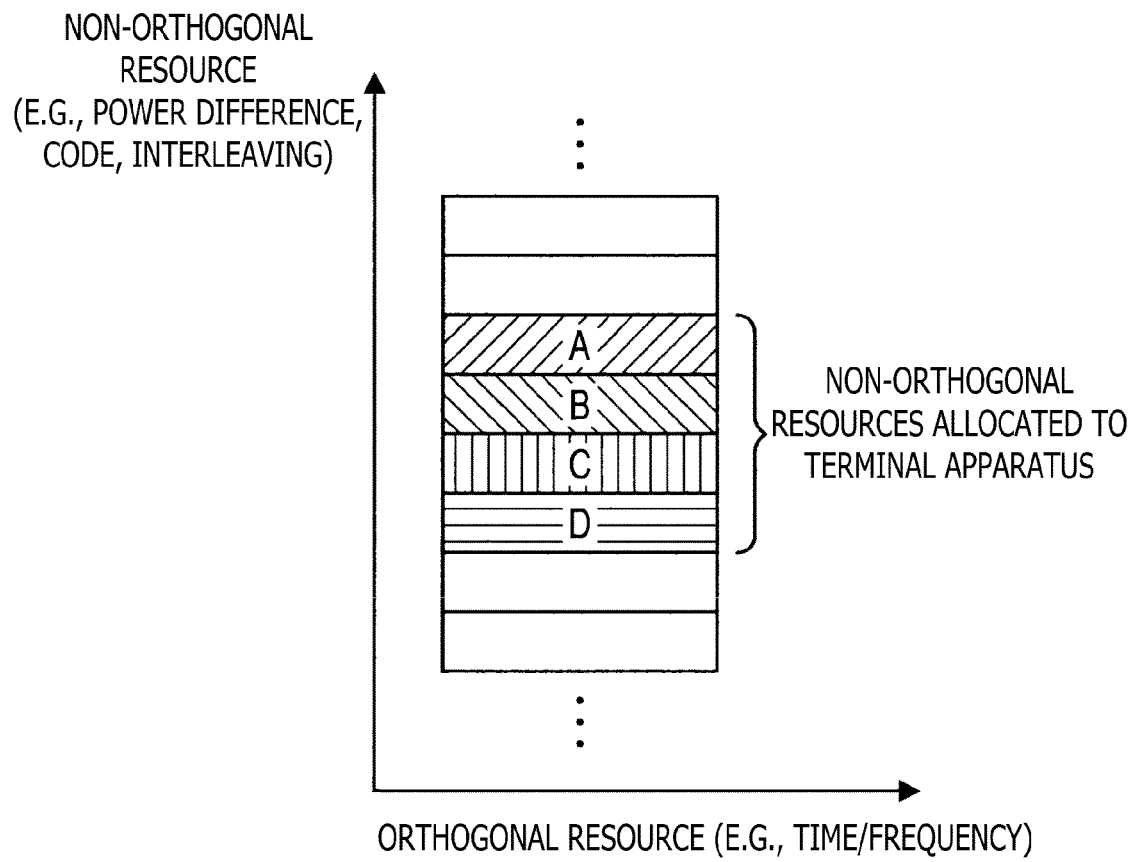
FIG. 7 is a diagram describing an example of a transmission pattern according to the present embodiment.

FIG. 7 is a diagram describing an example of a transmission pattern according to the present embodiment. In the example illustrated in FIG. 7, the transmission pattern is a non-orthogonal resource (i.e., MA signature). The terminal apparatus 200 sets a plurality of non-orthogonal resources and information corresponding to each of the non-orthogonal resources through RRC signaling from the base station apparatus 100. In the example illustrated in FIG. 7, four non-orthogonal resources are allocated to the terminal apparatus 200. A non-orthogonal resource A corresponds to a first piece of information, a non-orthogonal resource B corresponds to a second piece of information, a non-orthogonal resource C corresponds to a third piece of information, and a non-orthogonal resource D corresponds to a fourth piece of information. In the case where uplink data to be sent grant-free occurs, the terminal apparatus 200 selects a non-orthogonal resource to be used for transmission in accordance with a predetermined selection criterion and sends data by using the non-orthogonal resource in question. The base station apparatus 100 receives the data sent uplink from the terminal apparatus 200 and recognizes the non-orthogonal resource used for transmission of the data in question, thus indirectly receiving information corresponding to the non-orthogonal resource in question.

Orthogonal Resource

The transmission pattern may relate to an orthogonal resource used for data transmission. To be specific, the transmission pattern may be an orthogonal resource pattern used for data transmission. It should be noted that an orthogonal resource includes time, frequency, and/or code.

The terminal apparatus 200 sets a plurality of orthogonal resources and information corresponding to each of the orthogonal resources through RRC signaling from the base station apparatus 100. In the case where uplink data to be sent in a grant-free manner occurs, the terminal apparatus 200 selects an orthogonal resource in accordance with a predetermined selection criterion and sends data by using the orthogonal resource. The base station apparatus 100 receives the data sent uplink from the terminal apparatus 200 and recognizes the orthogonal resource used for transmission of the data in question, thus indirectly receiving information corresponding to the orthogonal resource in question.

DMRS

The transmission pattern may relate to a DMRS (Demodulation Reference Signal) for data to be sent. To be specific, the transmission pattern may be a DMRS pattern used for data to be sent. The DMRS pattern is a DMRS series (i.e., sequence), DMRS cyclic shift, DMRS scrambling, and/or DMRS antenna port, and so on.

The terminal apparatus 200 sets a plurality of DMRS patterns and information for each of the DMRS patterns through RRC signaling from the base station apparatus 100. In the case where uplink data to be sent in a grant-free manner occurs, the terminal apparatus 200 selects a DMRS pattern in accordance with a predetermined selection criterion and sends data by using the DMRS pattern in question. The base station apparatus 100 receives the data sent uplink from the terminal apparatus 200 and recognizes the DMRS pattern used for transmission of the data in question, thus indirectly receiving information corresponding to the DMRS pattern in question.

Scrambling

The transmission pattern may relate to scrambling of data to be sent. In other words, the transmission pattern may be a scrambling pattern of data to be sent.

Here, data refers to a data channel (PUSCH (Physical Uplink Shared Channel)), a transport block, a code block, or a code block group. Also, data to be scrambled is at least either data to be sent as a whole or a redundant bit of an error detection code generated from data to be sent (e.g., CRC (Cyclic Redundancy Check)).

The terminal apparatus 200 sets a plurality of scrambling patterns and information for each of the scrambling patterns through RRC signaling from the base station apparatus 100. In the case where uplink data to be sent in a grant-free manner occurs, the terminal apparatus 200 selects a scrambling pattern in accordance with a predetermined selection criterion and sends data by using the scrambling pattern in question. The base station apparatus 100 receives the data sent uplink from the terminal apparatus 200 and recognizes the scrambling pattern used for transmission of the data in question, thus indirectly receiving information corresponding to the scrambling pattern in question.

As an example, scrambling of uplink data will be described. The terminal apparatus 200 performs scrambling processing on a redundant bit of an error detection code added to each code block through a predetermined scrambling sequence. This predetermined scrambling sequence is a scrambling pattern, and each of the plurality of scrambling sequences corresponds to a predetermined piece of information. The base station apparatus 100 can recognize the scrambling pattern used for transmission by performing descrambling processing on the redundant bit in question using a predetermined scrambling sequence.

Beam Pattern

The transmission pattern may relate to a beam for data to be sent. In other words, the transmission pattern may be a beam pattern for data to be sent.

Here, the beam refers to a signal (or radio wave) sent or received by narrowing (reducing) a directivity of an antenna on a transmitting or receiving side. The beam pattern refers to a beam directivity (e.g., shape or direction). To be specific, the beam pattern includes at least a beam pattern on the transmitting side, a beam pattern on the receiving side, a beam link pair, a precoding matrix, and a transmission diversity method. The beam link pair is a preferred pair of a beam pattern on the transmitting side and a beam pattern on the receiving side.

The terminal apparatus 200 sets a plurality of beam patterns and information corresponding to each of the beam patterns through RRC signaling from the base station apparatus 100. In the case where uplink data to be sent in a grant-free manner occurs, the terminal apparatus 200 selects a beam pattern in accordance with a predetermined selection criterion and sends data by using the beam pattern in question. The base station apparatus 100 performs beam pattern detection processing on the data sent uplink from the terminal apparatus 200, thus recognizing the beam pattern used for transmission of the data in question and indirectly receiving information corresponding to the beam pattern in question.

As an example, beam patterns for uplink data will be described. A plurality of beam patterns on the transmitting side for uplink data and information corresponding to each of the beam patterns are set in the terminal apparatus 200 through RRC signaling. The base station apparatus 100 holds information regarding beam link pairs and recognizes the beam pattern on the transmitting side selected by the terminal apparatus 200 on the basis of the beam pattern on the receiving side successfully detected from the plurality of beam patterns on the receiving side. As a result, the base station apparatus 100 can acquire information corresponding to the beam pattern on the transmitting side of the terminal apparatus 200.

Combination

Two or more of the transmission patterns described above may be used in combination.

A description will be given of a case in which the transmission pattern is a combination of a non-orthogonal resource and an orthogonal resource. We assume, for example, that four transmission patterns, namely, transmission patterns A to D, are set. The transmission pattern A is a combination of a non-orthogonal resource A and an orthogonal resource A. The transmission pattern B is a combination of the non-orthogonal resource A and an orthogonal resource B. The transmission pattern C is a combination of a non-orthogonal resource B and the orthogonal resource A. The transmission pattern D is a combination of the non-orthogonal resource B and the orthogonal resource B. These combinations make it possible to strike a balance between an advantage of improved efficiency in frequency use achieved by using a non-orthogonal resource and high reception performance ensured by using an orthogonal resource.

A description will be given of a case in which the transmission pattern is a combination of a non-orthogonal resource and a DMRS. For example, the DMRS to be used in combination with a non-orthogonal resource is determined on the basis of at least the non-orthogonal resource in question. As a result, even in the case where pieces of uplink data from the plurality of terminal apparatuses 200 collide with each other, it is possible to suppress interference with the DMRS in the base station apparatus 100. As a result, it is possible to enhance channel estimation performance for the pieces of data that have collided with each other.

3.3 Information Corresponding to Transmission Patterns

Information corresponding to a transmission pattern is information for processing of receiving data sent in a grant-free manner. The criterion for selecting a transmission pattern can also be construed as which information is appropriate to be notified for the processing of receiving data to be sent. The base station apparatus 100 can properly perform the processing of receiving data sent in a grant-free manner by using the transmission pattern in question by indirectly receiving information corresponding to the transmission pattern.

A description will be given below of an example of information corresponding to the transmission pattern according to the present embodiment.

Number of Transmissions in Retransmission Control

Information corresponding to a transmission pattern may be the number of transmissions in retransmission of data to be sent in a grant-free manner. A detailed description will be given of this respect with reference to FIG. 8.

Figure 8:
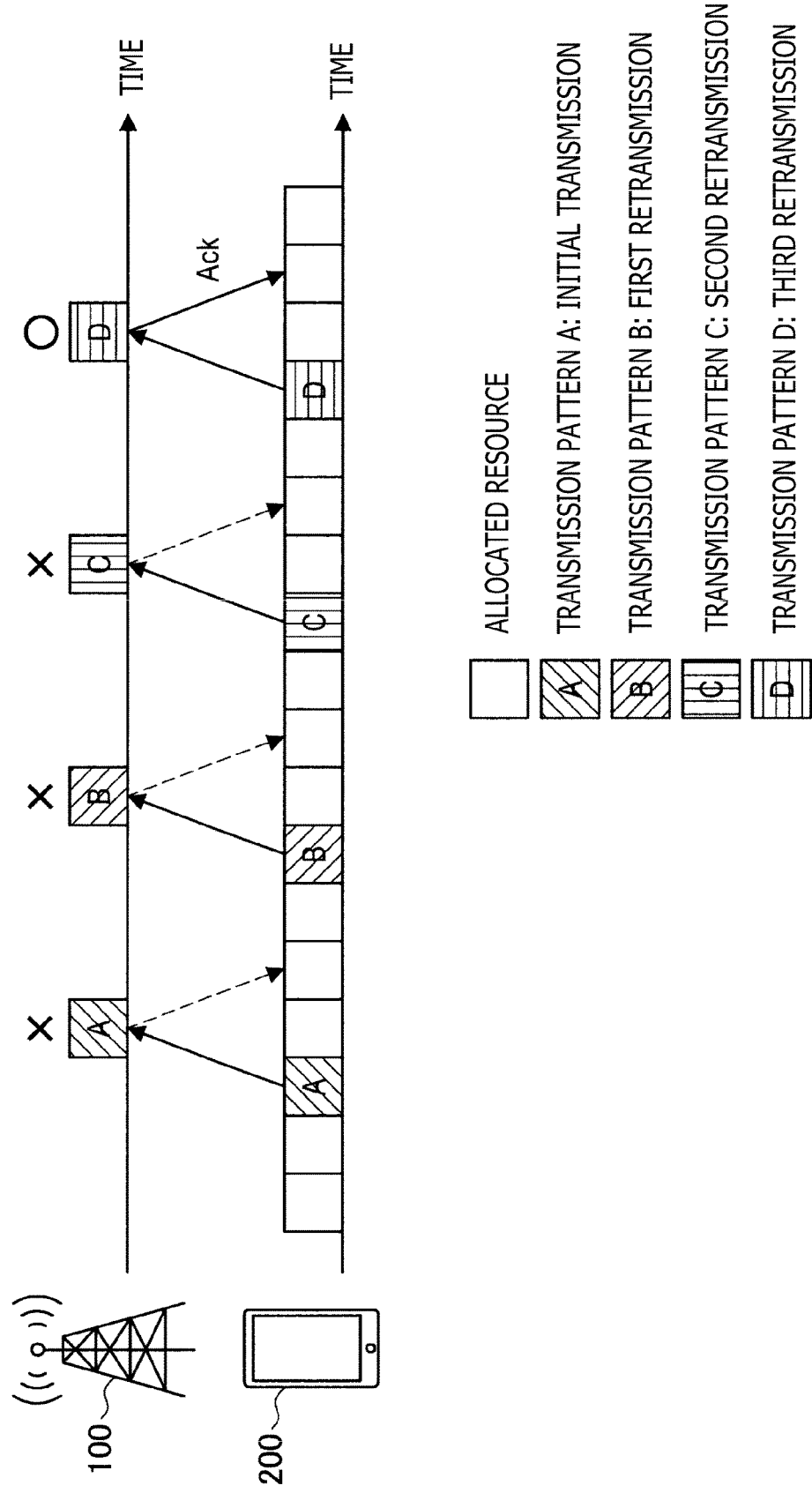
FIG. 8 is a diagram describing an example of information corresponding to a transmission pattern according to the present embodiment.

FIG. 8 is a diagram describing an example of information corresponding to a transmission pattern according to the present embodiment. The terminal apparatus 200 sends the same uplink data by using a transmission pattern corresponding to the number of transmissions in retransmission control. That is, the criterion for selecting a transmission pattern is the number of transmissions in retransmission control. In the example illustrated in FIG. 8, the terminal apparatus 200 sends data by using the transmission pattern A at the initial transmission, the transmission pattern B at the first retransmission, the transmission pattern C at the second retransmission, and the transmission pattern D at the third retransmission. The base station apparatus 100 recognizes the number of transmissions of the received uplink data in question on the basis of the transmission pattern used for the received uplink data.

Even in the case where the base station apparatus 100 fails in the detection of uplink data from the terminal apparatus 200, the base station apparatus 100 can recognize the number of transmissions so far on the basis of the transmission pattern used for data retransmitted subsequently. In the example illustrated in FIG. 8, the base station apparatus 100 fails in the detection of uplink data at the initial transmission, the first retransmission, and the second retransmission and successfully detects uplink data at the third retransmission. In this case, the base station apparatus 100 can recognize that the uplink data was retransmitted for the third time by recognizing that the transmission pattern D was used for the successfully detected uplink data. In the case where data is sent a number of times from the terminal apparatus 200, it is possible to change resources or perform other processing.

Also, the terminal apparatus 200 can determine transmission parameters (e.g., coding rate, transmission power, and RV (Redundancy version)) in accordance with the number of transmissions in retransmission control. As described above, the transmission patterns are associated with the numbers of transmissions. This makes it possible for the base station apparatus 100 to recognize the transmission parameters of the received uplink data on the basis of the detected (i.e., successfully received) transmission pattern. Even in the case where the base station apparatus 100 fails in the detection of uplink data from the terminal apparatus 200, no discrepancy occurs in the recognition regarding the number of transmissions and the transmission parameters between the base station apparatus 100 and the terminal apparatus 200. This allows the base station apparatus 100 to perform the reception processing properly.

In the case where the number of transmissions of certain data in retransmission control exceeds a predetermined threshold, the data in question may be sent by using a predetermined transmission pattern. For example, in the case where the number of transmissions of uplink data exceeds a predetermined maximum number of transmissions, the terminal apparatus 200 sends the uplink data in question in a grant-free manner by using the transmission pattern corresponding to the maximum number of transmissions in question. For example, in the case where the maximum number of transmissions is four in the example illustrated in FIG. 8, the terminal apparatus 200 sends uplink data for the fourth or subsequent retransmission by using the transmission pattern D.

In addition to the above, two transmission patterns may be available as a plurality of transmission patterns as options for selection, with the first transmission pattern indicating the first transmission, and the second transmission pattern indicating a retransmission. That is, two transmission patterns may be set so that these transmission patterns indicate whether data has been sent for the first time or resent. Specifically, the first transmission pattern indicates that the uplink data has been sent for the first time, and the second transmission pattern indicates that the uplink data has been resent (including the second or subsequent retransmission).

Number of Transmissions in Repeated Transmission

Information corresponding to a transmission pattern may be the number of transmissions in repeated transmission of data to be sent in a grant-free manner. A detailed description will be given of this respect with reference to FIG. 9.

FIG. 9 is a diagram for describing an example of information corresponding to a transmission pattern according to the present embodiment. The terminal apparatus 200 repeatedly sends the same uplink data the number of repetitions set by the base station apparatus 100. Uplink data to be sent repeatedly is sent by using the transmission pattern corresponding to the number of transmissions. That is, the criterion for selecting a transmission pattern is the number of transmissions in repeated transmission. In the example illustrated in FIG. 9, the terminal apparatus 200 sends data by using the transmission pattern A for the first repeated transmission, the transmission pattern B for the second repeated transmission, the transmission pattern C for the third repeated transmission, and the transmission pattern D for the fourth repeated transmission. The repeated transmission of the same data ensures improved reliability and reception characteristics (specifically, error rate characteristic and SN ratio) of the data. The base station apparatus 100 recognizes, on the basis of the transmission pattern used for the received uplink data, the number of transmissions of the uplink data. This makes it possible for the base station apparatus 100 to recognize the first transmission and/or the last transmission or a repeated transmission interval in repeated transmission of the uplink data in question.

Even in the case where the base station apparatus 100 fails in the detection of uplink data from the terminal apparatus 200, the base station apparatus 100 can recognize the repeated transmission interval on the basis of the transmission pattern of other uplink data. This makes it possible for the base station apparatus 100 to recognize the uplink data to be subjected to processing related to repeated transmission (e.g., combining and demodulation processing). In the example illustrated in FIG. 9, the base station apparatus 100 fails in the reception of data #1 repeatedly sent for the first and third times. However, the base station apparatus 100 successfully receives the data repeatedly sent for the second and fourth times, thus allowing for recognition of the repeated transmission interval and application of the combining and demodulation processing to the data received during the recognized interval. The same holds true for data #2.

Also, the terminal apparatus 200 may determine transmission parameters (e.g., coding rate, transmission power, and RV) in accordance with the number of transmissions in repeated transmission. As described above, the transmission patterns are associated with the numbers of transmissions. This makes it possible for the base station apparatus 100 to recognize the transmission parameters of the received uplink data on the basis of the detected transmission pattern. Even in the case where the base station apparatus 100 fails in the detection of uplink data from the terminal apparatus 200, no discrepancy occurs in the recognition regarding the number of transmissions and the transmission parameters between the base station apparatus 100 and the terminal apparatus 200. This allows the base station apparatus 100 to perform the reception processing properly.

In the case where the repeated transmission halts before the set maximum number of repeated transmissions is reached, the transmission pattern corresponding to the maximum number of repeated transmissions may be used for the data sent at a last session of the repeated transmission. In the example illustrated in FIG. 9, the maximum number of repeated transmissions is four. For example, in the case where the repeated transmission is halted after the third transmission, the terminal apparatus 200 sends the link data to be sent for the third transmission by using the transmission pattern D (i.e., transmission pattern to be used for the fourth repeated transmission). This makes it possible for the base station apparatus 100 to recognize that the terminal apparatus 200 halted the repeated transmission halfway through the transmission and which transmission was the last one.

The repeated transmission is halted in the case where a predetermined condition is met. One example of such a predetermined condition is that it becomes necessary, during repeated transmission of a first piece of data, to send a second piece of data, a different piece of data. The predetermined condition may include the fact that the second piece of data has higher priority than the first piece of data and/or the fact that the second piece of data occurs after the first piece of data. In addition to the above, the transmission power that can be used for repeated transmission is smaller than a predetermined threshold.

HARQ Process

Information corresponding to a transmission pattern may be a process number in retransmission control. Specifically, information corresponding to a transmission pattern may be an HARQ (Hybrid automatic repeat request) process number.

An HARQ process is a unit (i.e., process) of conducting retransmission control over data. The terminal apparatus 200 can conduct a plurality of retransmission control tasks in parallel by using a plurality of HARQ processes. Each of the HARQ processes is managed by an HARQ process number (index). It should be noted that the performance of only one HARQ process in grant-free transmission is assumed in the 5G discussion regarding grant-free transmission.

A detailed description will be given of a case in which information corresponding to a transmission pattern is an HARQ process number with reference to FIG. 10.

Figure 10:
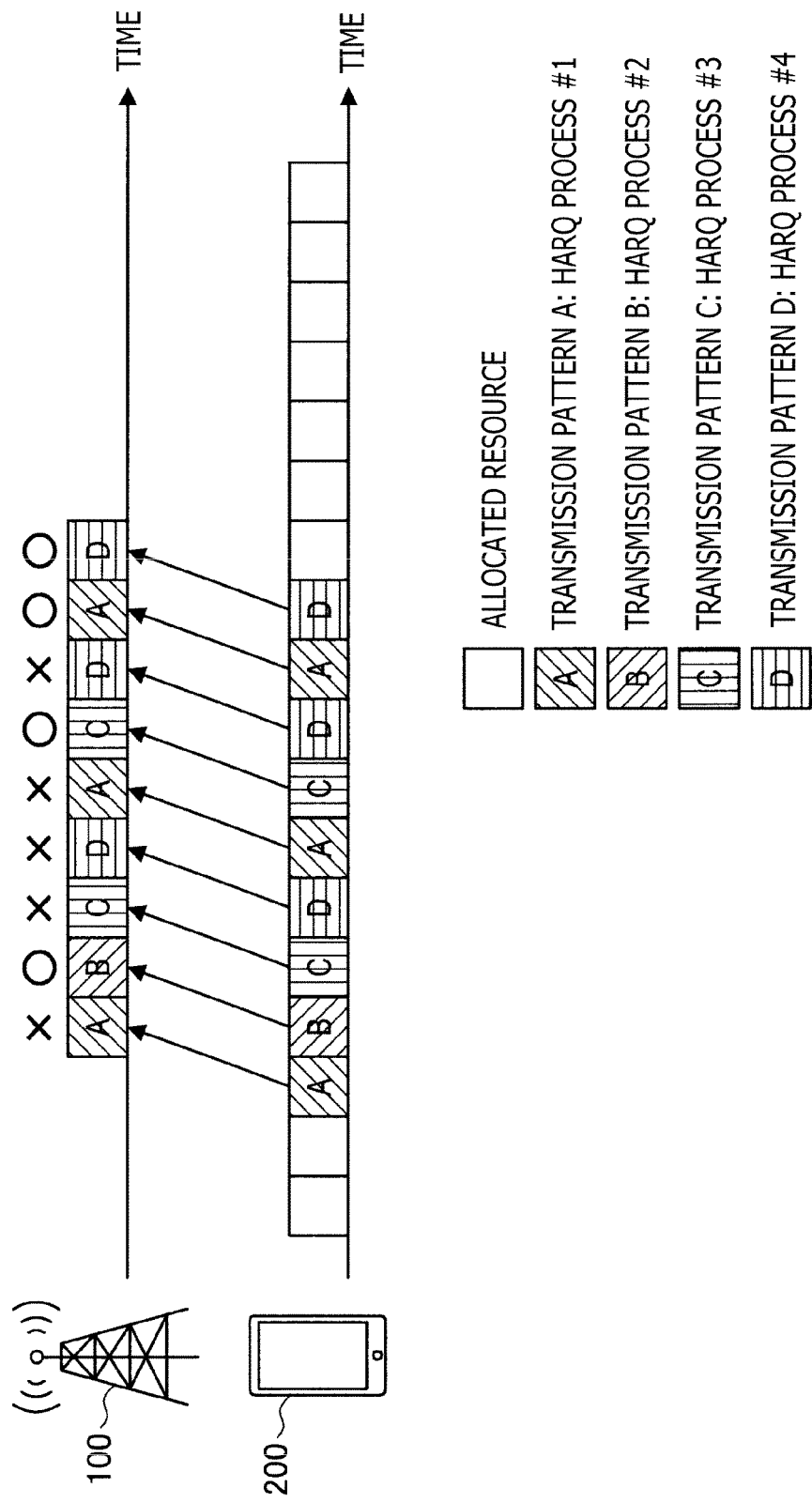
FIG. 10 is a diagram for describing an example of information corresponding to a transmission pattern according to the present embodiment.

FIG. 10 is a diagram for describing an example of information corresponding to a transmission pattern according to the present embodiment. The terminal apparatus 200 sends each piece of uplink data for a plurality of HARQ processes by using the transmission pattern corresponding to the HARQ process number. That is, the criterion for selecting a transmission pattern is an HARQ process number. In the example illustrated in FIG. 10, the terminal apparatus 200 uses the transmission pattern A for uplink data of an HARQ process #1. The terminal apparatus 200 uses the transmission pattern B for uplink data of an HARQ process #2. The terminal apparatus 200 uses the transmission pattern C for uplink data of an HARQ process #3. The terminal apparatus 200 uses the transmission pattern D for uplink data of an HARQ process #4. The base station apparatus 100 can properly return HARQ ACK/NACK in each of the HARQ processes by recognizing, on the basis of the transmission pattern used for the received uplink data, the HARQ process number of that uplink data. In the example illustrated in FIG. 10, the base station apparatus 100 fails in the reception of the uplink data of the HARQ process #1 twice, successfully receives the data in its third attempt, and returns HARQ ACK. The base station apparatus 100 successfully receives the uplink data of the HARQ process #2 in its first attempt and returns HARQ ACK. The base station apparatus 100 fails in the reception of the uplink data of the HARQ process #3 once, successfully receives the data in its second attempt, and returns HARQ ACK. The base station apparatus 100 fails in the reception of the uplink data of the HARQ process #4 twice, successfully receives the data in its third attempt, and returns HARQ ACK. As described above, a plurality of HARQ processes can be used in grant-free transmission. The terminal apparatus 200 allows for scheduling of transmission in accordance with urgency, priority, or other factor of uplink data.

Also, the terminal apparatus 200 may determine transmission parameters (e.g., coding rate, transmission power, and RV (Redundancy version)) of uplink data in accordance with the HARQ process number. As described above, the transmission patterns are associated with the HARQ process numbers. This makes it possible for the base station apparatus 100 to recognize the transmission parameters of the received uplink data on the basis of the detected (i.e., successfully received) transmission pattern. Even in the case where the base station apparatus 100 fails in the detection of uplink data from the terminal apparatus 200, no discrepancy occurs in the recognition regarding the HARQ process numbers and the transmission parameters between the base station apparatus 100 and the terminal apparatus 200. This allows the base station apparatus 100 to perform the reception processing properly.

Also, different transmission parameters may be set for the plurality of HARQ processes, respectively, in accordance with the urgency or priority of different pieces of uplink data. This makes it possible for the terminal apparatus 200 to send uplink data by using the transmission parameters corresponding to the urgency or priority of the uplink data.

Transmission Parameter

Information corresponding to a transmission pattern may be transmission pattern used for data to be sent in a grant-free manner. Details of the transmission parameters will be described in detail later. It should be noted that the performance of grant-free transmission using only one transmission parameter is assumed in the 5G discussion regarding grant-free transmission. A detailed description will be given of a case in which information corresponding to a transmission pattern is a transmission parameter with reference to FIG. 11.

Figure 11:
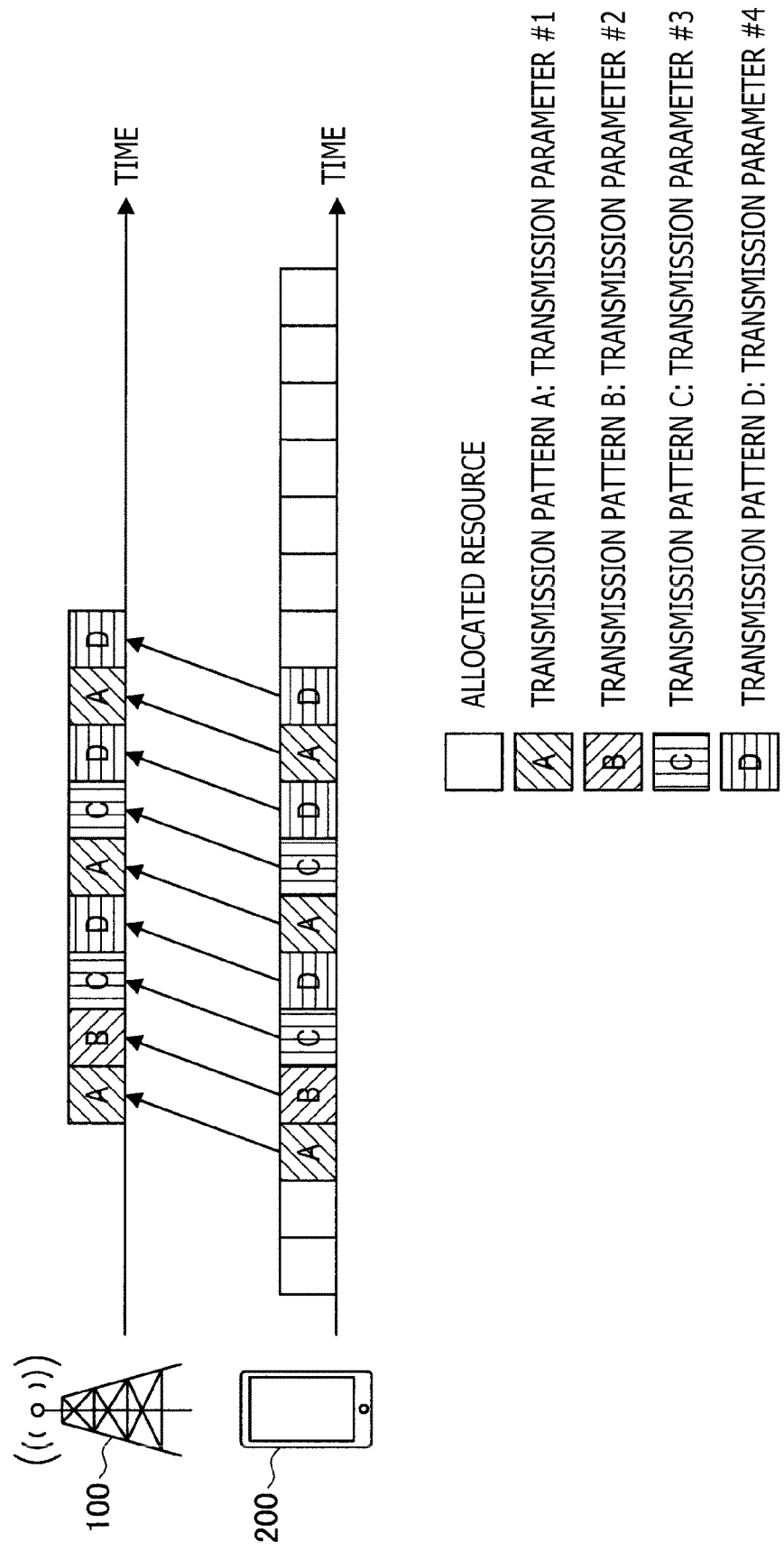
FIG. 11 is a diagram for describing an example of information corresponding to a transmission pattern according to the present embodiment.

FIG. 11 is a diagram for describing an example of information corresponding to a transmission pattern according to the present embodiment. The terminal apparatus 200 sends uplink data by using a transmission pattern corresponding to the transmission parameter used for the uplink data. That is, the criterion for selecting a transmission pattern is a transmission parameter. In the example illustrated in FIG. 11, the terminal apparatus 200 uses the transmission pattern A for uplink data that uses a transmission parameter #1. The terminal apparatus 200 uses the transmission pattern B for uplink data that uses a transmission parameter #2. The terminal apparatus 200 uses the transmission pattern C for uplink data that uses a transmission parameter #3. The terminal apparatus 200 uses the transmission pattern D for uplink data that uses a transmission parameter #4. A transmission parameter can be set for a transmission pattern by the base station apparatus 100 in advance through RRC signaling. The base station apparatus 100 recognizes, on the basis of the transmission pattern used for the received uplink data, the transmission parameter used for the uplink data in question.

As described above, it is possible to achieve dynamic uplink transmission using a plurality of transmission parameters in grant-free transmission. This makes it possible for the terminal apparatus 200 to adaptively control transmission parameters in accordance with the urgency or priority of uplink data.

3.4 Definitions of Transmission Pattern and Transmission Parameter

A description will be given below of definitions of the transmission pattern and transmission parameter in the present specification.

Transmission Pattern

The transmission pattern includes a non-orthogonal resource, an orthogonal resource, a data DMRS, scrambling of data and/or a data beam pattern. The transmission pattern may include, in addition to the above, identification information (i.e., indices) indicating them.

One transmission pattern is selected by the terminal apparatus 200 from among the plurality of transmission patterns set by the base station apparatus 100 for transmission of uplink data. The selection in question can be made on the basis of information which the terminal apparatus 200 desires to notify to the base station apparatus 100.

The base station apparatus 100 does not recognize in advance which transmission pattern has been selected. On the other hand, the base station apparatus 100 can recognize which transmission pattern has been used by the terminal apparatus 200 to send data. That is, the base station apparatus 100 can recognize which transmission pattern has been selected by detecting the transmission pattern used for transmission from the terminal apparatus 200.

Transmission Parameter

The transmission parameter includes a modulation scheme, a coding rate, transmission power, an RV, an NDI (New data indicator), number of layers (i.e., MIMO (multiple-input and multiple-output) multiplexed streams), a beam pattern, and/or precoding pattern, and so on. The transmission parameter may be any one of these or a combination thereof. The transmission parameter may include, in addition to the above, identification information (i.e., indices) indicating them.

One or a plurality of transmission parameters is set by the terminal apparatus 200 from the base station apparatus 100. A transmission parameter, determined from among the set parameters on the basis of a predetermined condition, is used for uplink data. The predetermined condition is determined by an instruction from the base station apparatus 100 or a specification. That is, the transmission parameter is not selected by the terminal apparatus 200. The base station apparatus 100 recognizes in advance which transmission parameter is used (i.e., before grant-free transmission is carried out). The base station apparatus 100 does not need to recognize which transmission parameter was used by the terminal apparatus 200 for transmission. That is, the base station apparatus 100 does not need to detect the transmission parameter used by the terminal apparatus 200 for transmission.

3.5 Processing Flows

A description will be given below of an example of a flow of grant-free transmission processing carried out in the system 1 with reference to FIGS. 12 and 13.

Figure 12:
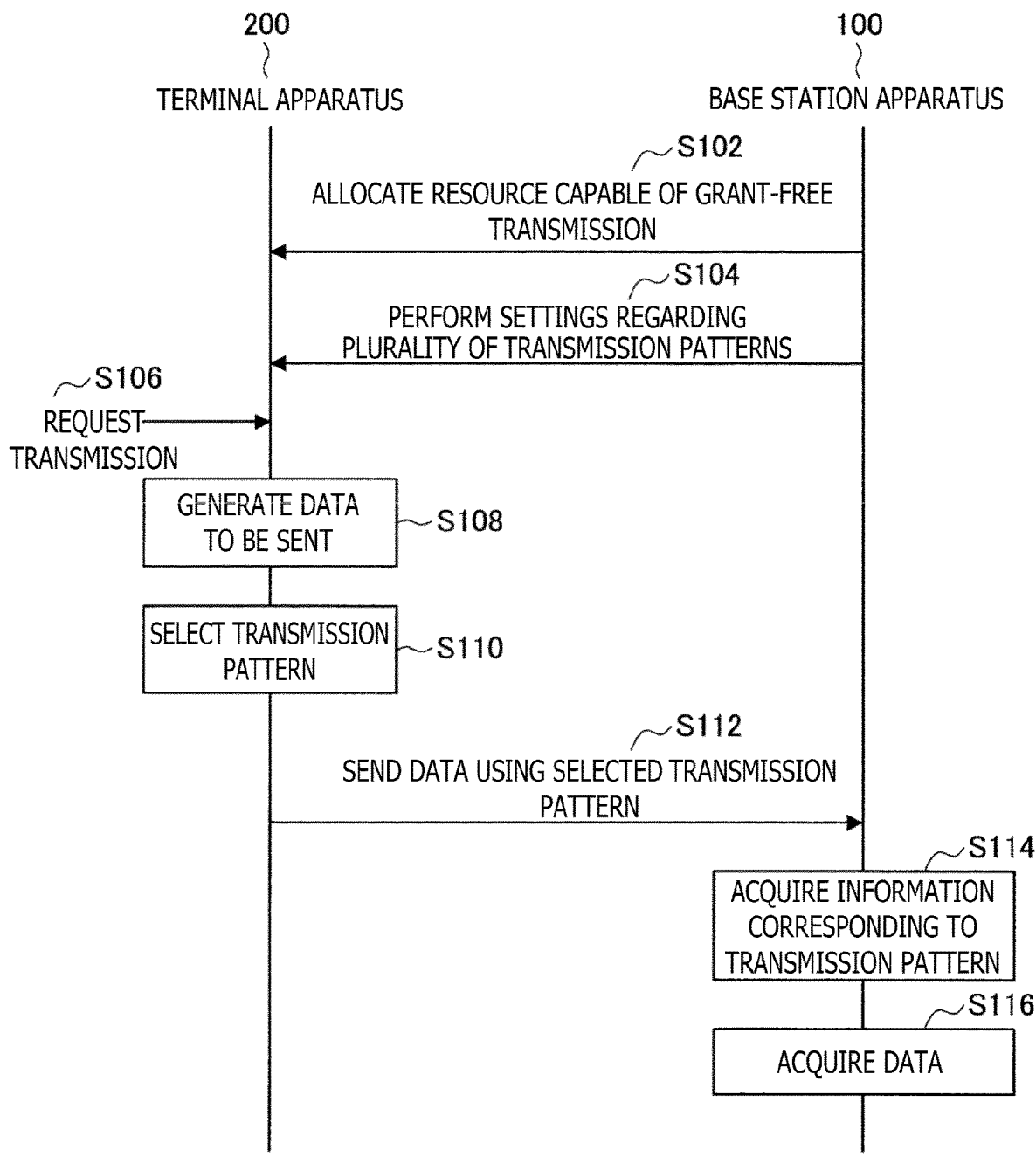
FIG. 12 is a sequence diagram illustrating an example of a flow of grant-free transmission processing carried out in the system according to the present embodiment.

FIG. 12 is a sequence diagram illustrating an example of a flow of grant-free transmission processing carried out in the system 1 according to the present embodiment. In the present sequence, the base station apparatus 100 and the terminal apparatuses 200 participate to carry out grant-free transmission in uplink transmission.

As illustrated in FIG. 12, the base station apparatus 100 allocates a resource capable of grant-free transmission to the terminal apparatus 200 first (step S102). Next, the base station apparatus 100 performs settings regarding a plurality of transmission patterns corresponding to predetermined pieces of information different from each other (step S104).

The terminal apparatus 200 waits until a transmission request occurs, and when such a request occurs (step S106), the terminal apparatus 200 generates data to be sent (step S108) and selects a transmission pattern in accordance with a predetermined selection criterion (step S110). Then, the terminal apparatus 200 sends the data by using the selected transmission pattern (step S112).

Next, the base station apparatus 100 recognizes the transmission pattern used for the data sent from the terminal apparatus 200 and acquires information corresponding to the transmission pattern in question (step S114). Then, the base station apparatus 100 acquires the data sent from the terminal apparatus 200 by using the information corresponding to the transmission pattern (step S116).

This terminates the processing.

Figure 13:
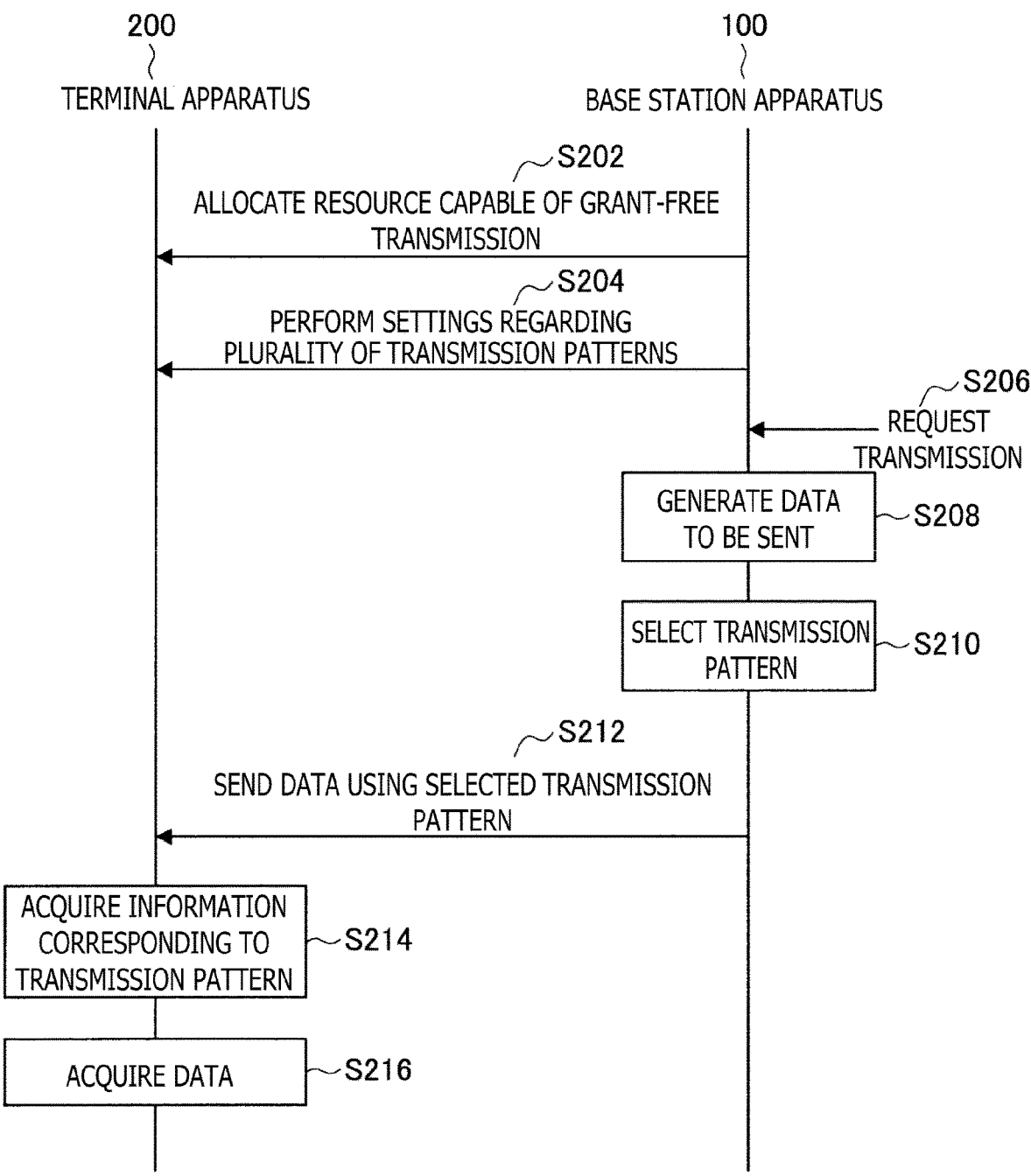
FIG. 13 is a sequence diagram illustrating an example of a flow of grant-free transmission processing carried out in the system according to the present embodiment.

FIG. 13 is a sequence diagram illustrating an example of a flow of grant-free transmission processing carried out in the system 1 according to the present embodiment. In the present sequence, the base station apparatus 100 and the terminal apparatuses 200 participate to carry out grant-free transmission in downlink transmission.

As illustrated in FIG. 13, the base station apparatus 100 allocates a resource capable of grant-free transmission to the terminal apparatus 200 first (step S202). Next, the base station apparatus 100 performs settings regarding a plurality of transmission patterns corresponding to predetermined pieces of information different from each other (step S204).

The base station apparatus 100 waits until a transmission request occurs, and when such a request occurs (step S206), the base station apparatus 100 generates data to be sent (step S208) and selects a transmission pattern in accordance with a predetermined selection criterion (step S210). Then, the base station apparatus 100 sends the data by using the selected transmission pattern (step S212).

Next, the terminal apparatus 200 recognizes the transmission pattern used for the data sent from the base station apparatus 100 and acquires information corresponding to the transmission pattern in question (step S214). Then, the terminal apparatus 200 acquires the data sent from the base station apparatus 100 by using the information corresponding to the transmission pattern (step S216).

This terminates the processing.

4. Application Example

A description will be given below of an application example of the technology according to the present disclosure. It should be noted that an eNB (evolved Node B) is also referred to as a gNB in the present specification.

The technology according to the present disclosure is applicable to a variety of products. For example, the base station apparatus 100 may be realized as a type of eNB (evolved Node B) such as macro eNB or small eNB. A small eNB may be an eNB such as pico eNB, micro eNB, or home (femto) eNB that covers cells smaller than macrocells. Instead, the base station apparatus 100 may be realized as other type of base station such as NodeB or BTS (Base Transceiver Station). The base station apparatus 100 may include a main body that controls wireless communication (also referred to as a base station apparatus) and one or more RRHs (Remote Radio Heads) that are installed at different locations from the main body. Also, various types of terminals which will be described later may function as the base station apparatus 100 by carrying out a base station function temporarily or semi-permanently.

Also, for example, the terminal apparatus 200 and a terminal apparatus 300 may be realized as smartphones, tablet PCs (Personal Computers), laptop PCs, portable gaming consoles, portable/dongle mobile routers, or mobile terminals such as digital cameras, or vehicle-mounted terminals such as car navigation apparatuses. Also, the terminal apparatuses 200 and 300 may be realized as terminals (MTC (Machine Type Communication) terminals) that engage in M2M (Machine To Machine) communication. Further, the terminal apparatuses 200 and 300 may be realized as wireless communication modules mounted to these terminals (e.g., integrated circuit modules that include a single die).

4.1. Application Examples Related to Base Station Apparatus

First Application Example

Figure 14:
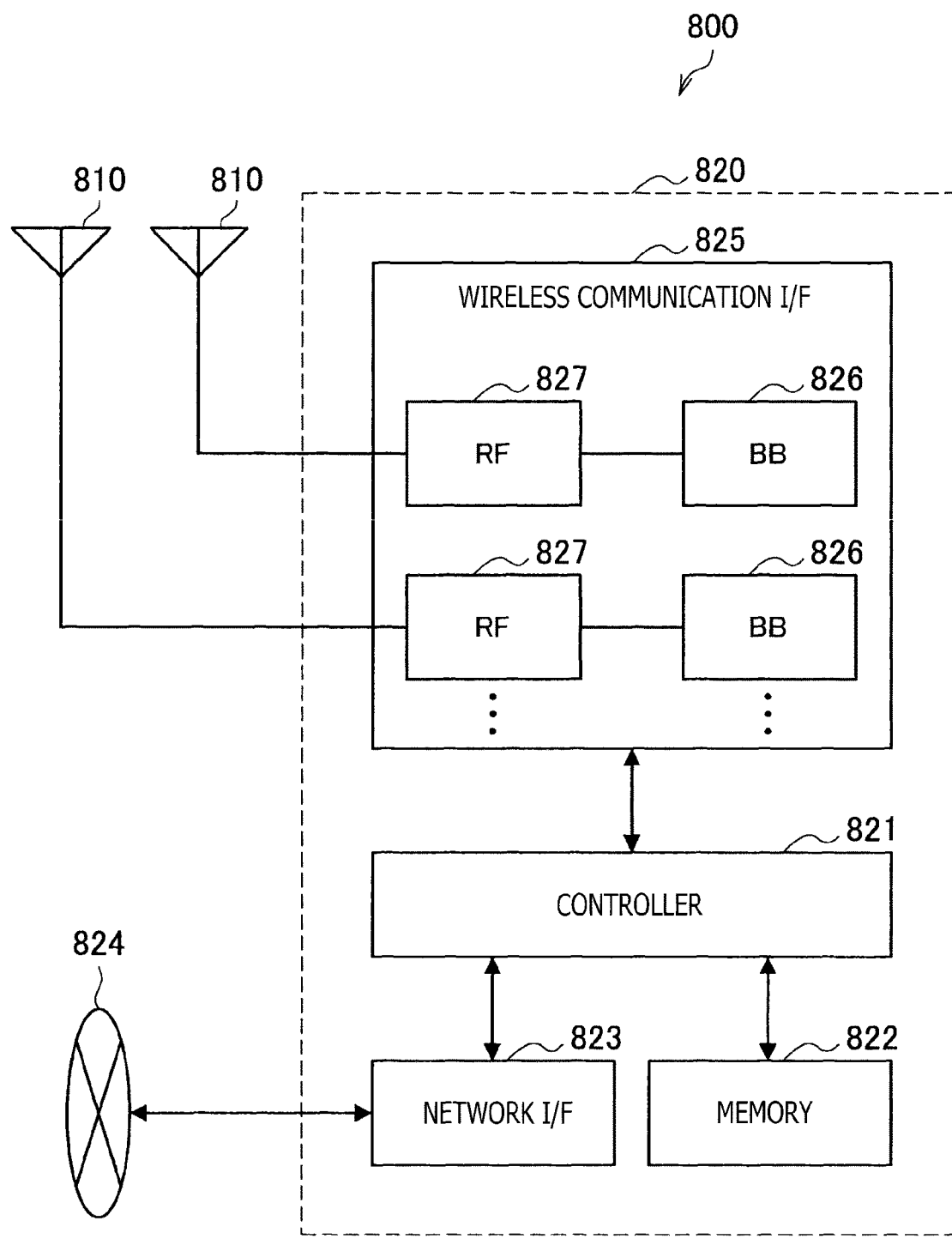
FIG. 14 is a block diagram illustrating a first example of a schematic configuration of an eNB.

FIG. 14 is a block diagram illustrating a first example of a schematic configuration of an eNB to which the technology according to the present disclosure is applicable. An eNB 800 has one or more antennas 810 and a base station apparatus 820. Each of the antennas 810 and the base station apparatus 820 can be connected to each other via RF cables.

Each of the antennas 810 has one or a plurality of antenna elements (e.g., a plurality of antenna elements included in a MIMO antenna) and is used for transmission and reception of wireless signals by the base station apparatus 820. The eNB 800 has the plurality of antennas 810 as illustrated in FIG. 14, and the plurality of antennas 810 may correspond, for example, to a plurality of frequency bands used by the eNB 800, respectively. It should be noted that although FIG. 14 depicts an example in which the eNB 800 has the plurality of antennas 810, the eNB 800 may have only one antenna 810.

The base station apparatus 820 includes a controller 821, a memory 822, a network interface 823, and a wireless communication interface 825.

The controller 821 may be, for example, a CPU or a DSP and activates various upper layer functions of the base station apparatus 820. For example, the controller 821 generates a data packet from data in a signal processed by the wireless communication interface 825 and transfers the generated packet via the network interface 823. The controller 821 may generate a bundled packet by bundling pieces of data from a plurality of baseband processors and transfer the generated bundled packet. Also, the controller 821 may have a logical function to perform a control task such as radio resource control, radio bearer control, mobility management, admission control, or scheduling. Also, the control task in question may be performed in coordination with a surrounding eNB or core network node. The memory 822 includes a RAM and a ROM and stores a program executed by the controller 821 and various control data (e.g., terminal list, transmission power data, and scheduling data).

The network interface 823 is a communication interface for connecting the base station apparatus 820 to a core network 824. The controller 821 may communicate with a core network node or other eNB. In that case, the eNB 800 and the core network node or the other eNB may be connected to each other by a logical interface (e.g., S1 interface or X2 interface). The network interface 823 may be a wired communication interface or a wireless communication interface for wireless backhaul. In the case where the network interface 823 is a wireless communication interface, the network interface 823 may use, for wireless communication, a frequency band higher than that used by the wireless communication interface 825.

The wireless communication interface 825 supports a cellular communication scheme such as LTE (Long Term Evolution) or LTE-Advanced and provides wireless connection to terminals located in a cell of the eNB 800 via the antennas 810. The wireless communication interface 825 can typically include a baseband (BB) processor 826, an RF circuit 827, and so on. The BB processor 826 may perform, for example, coding/decoding, modulation/demodulation, multiplexing/demultiplexing, and other tasks and carry out various signal processing tasks of each layer (e.g., L1, MAC (Medium Access Control), RLC (Radio Link Control), and PDCP (Packet Data Convergence Protocol)). The BB processor 826 may have part or whole of the above logical function in place of the controller 821. The BB processor 826 may be a module that includes a memory that stores a communication control program, a processor that executes the program, and related circuitry, and the function of the BB processor 826 can be changed by updates of the above program. Also, the above module may be a card or a blade inserted into a slot of the base station apparatus 820 or may be a chip mounted to the above card or the above blade. On the other hand, the RF circuit 827 may include a mixer, a filter, an amplifier, and so on and send and receive wireless signals via the antennas 810.

The wireless communication interface 825 includes the plurality of BB processors 826 as illustrated in FIG. 14, and the plurality of BB processors 826 may correspond, for example, to the plurality of frequency bands used by the eNB 800, respectively. Also, the wireless communication interface 825 includes the plurality of RF circuits 827 as illustrated in FIG. 14, and the plurality of RF circuits 827 may correspond, for example, to the plurality of antenna elements, respectively. It should be noted that although FIG. 14 depicts an example in which the wireless communication interface 825 includes the plurality of BB processors 826 and the plurality of RF circuits 827, the wireless communication interface 825 may include only one BB processor 826 or only one RF circuit 827.

In the eNB 800 illustrated in FIG. 14, one or more components (the setting section 151 and/or the communication processing section 153) included in the base station apparatus 100 described with reference to FIG. 4 may be implemented in the wireless communication interface 825. Alternatively, at least some of these components may be implemented in the controller 821. As an example, the eNB 800 may be equipped with a module that includes part (e.g., the BB processor 826) or whole of the wireless communication interface 825 and/or the controller 821 so that one or more of the above components are implemented in the module in question. In this case, the above module may store a program for causing the processor to function as one or more of the above components (in other words, a program for causing the processor to perform the operation of one or more of the above components) and execute the program in question. As another example, a program for causing the processor to function as one or more of the above components may be installed to the eNB 800 so that the wireless communication interface 825 (e.g., the BB processor 826) and/or the controller 821 executes the program in question. As described above, the eNB 800, the base station apparatus 820, or the above module may be provided as an apparatus including one or more of the above components, and a program for causing the processor to function as one or more of the above components may be provided. Also, a readable recording medium having the above program recorded therein may be provided.

Also, in the eNB 800 illustrated in FIG. 14, the wireless communication section 120 described with reference to FIG. 4 may be implemented in the wireless communication interface 825 (e.g., the RF circuits 827). Also, the antenna section 110 may be implemented in the antennas 810. Also, the network communication section 130 may be implemented in the controller 821 and/or the network interface 823. Also, the storage section 140 may be implemented in the memory 822.

Second Application Example

Figure 15:
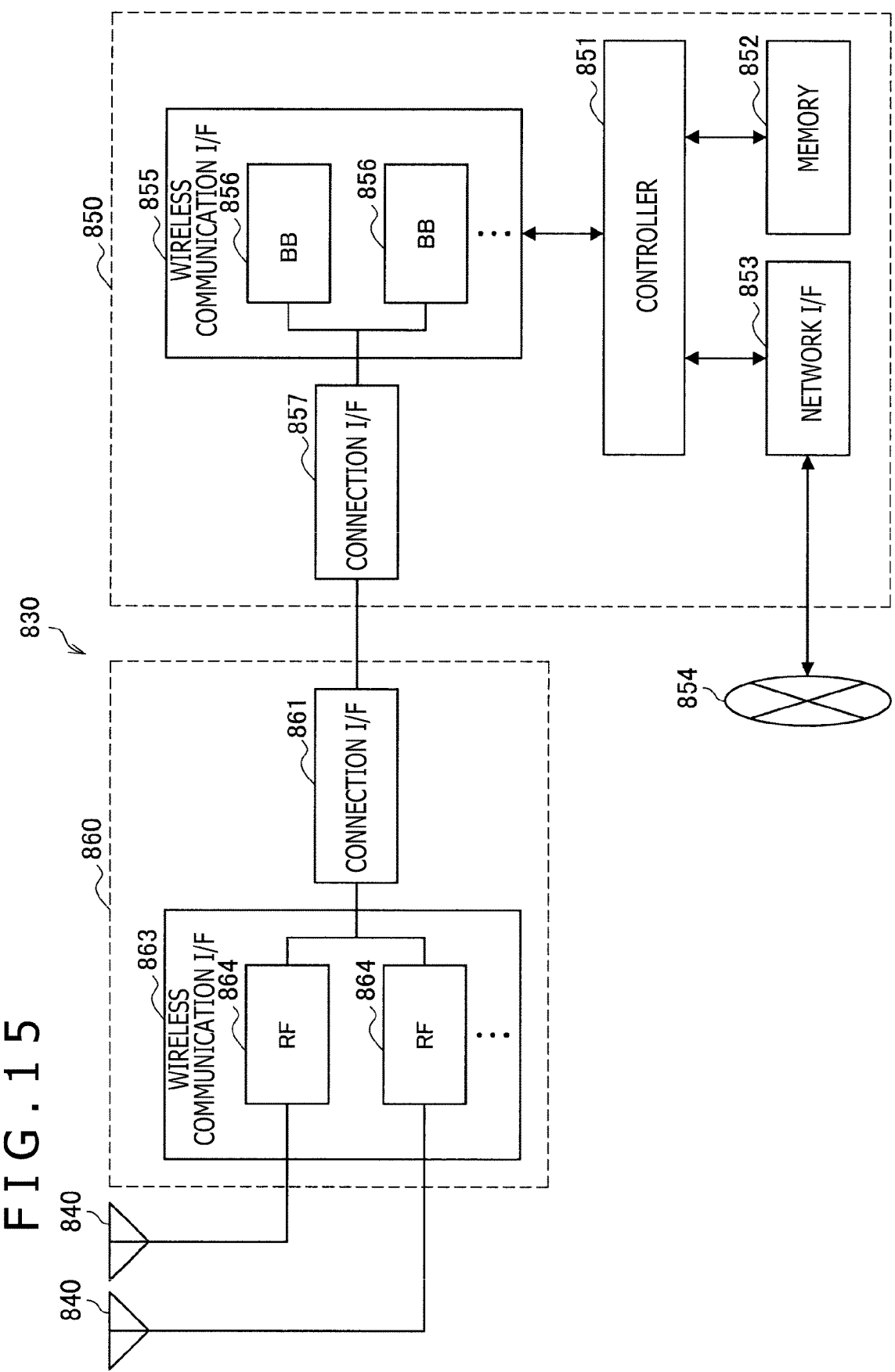
FIG. 15 is a block diagram illustrating a second example of a schematic configuration of an eNB.

FIG. 15 is a block diagram illustrating a second example of a schematic configuration of an eNB to which the technology according to the present disclosure is applicable. An eNB 830 has one or more antennas 840, a base station apparatus 850, and an RRH 860. Each of the antennas 840 and the RRH 860 can be connected to each other via RF cables. Also, the base station apparatus 850 and the RRH 860 can be connected to each other by a high-speed line such as fiber optic cable.

Each of the antennas 840 has one or a plurality of antenna elements (e.g., a plurality of antenna elements included in a MIMO antenna) and is used for transmission and reception of wireless signals by the RRH 860. The eNB 830 has the plurality of antennas 840 as illustrated in FIG. 15, and the plurality of antennas 840 may correspond, for example, to a plurality of frequency bands used by the eNB 830, respectively. It should be noted that although FIG. 15 depicts an example in which the eNB 830 has the plurality of antennas 840, the eNB 830 may have only one antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 14, respectively.

The wireless communication interface 855 supports a cellular communication scheme such as LTE or LTE-Advanced and provides wireless connection to terminals located in a sector corresponding to the RRH 860 via the RRH 860 and the antenna 840. The wireless communication interface 855 can typically include a BB processor 856 and so on. The BB processor 856 is similar to the BB processor 826 described with reference to FIG. 14 except that the BB processor 856 is connected to an RF circuit 864 of the RRH 860 via the connection interface 857. The wireless communication interface 855 includes the plurality of BB processors 856 as illustrated in FIG. 15, and the plurality of BB processors 856 may correspond, for example, to the plurality of frequency bands used by the eNB 830, respectively. It should be noted that although FIG. 15 depicts an example in which the wireless communication interface 855 includes the plurality of BB processors 856, the wireless communication interface 855 may include only one BB processor 856.

The connection interface 857 is an interface for connecting the base station apparatus 850 (wireless communication interface 855) to the RRH 860. The connection interface 857 may be a communication module for communication over the above high-speed line that connects the base station apparatus 850 (wireless communication interface 855) to the RRH 860.

Also, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication over the above high-speed line.

The wireless communication interface 863 sends and receives wireless signals via the antennas 840. The wireless communication interface 863 can typically include the RF circuit 864 and so on. The RF circuits 864 may include a mixer, a filter, an amplifier, and so on and send and receive wireless signals via the antennas 840. The wireless communication interface 863 includes the plurality of RF circuits 864 as illustrated in FIG. 15, and the plurality of RF circuits 864 may correspond, for example, to the plurality of antenna elements, respectively. It should be noted that although FIG. 15 depicts an example in which the wireless communication interface 863 includes the plurality of RF circuits 864, the wireless communication interface 863 may include only one RF circuit 864.

In the eNB 830 illustrated in FIG. 15, one or more components (the setting section 151 and/or the communication processing section 153) included in the base station apparatus 100 described with reference to FIG. 4 may be implemented in the wireless communication interface 855 and/or the wireless communication interface 863. Alternatively, at least some of these components may be implemented in the controller 851. As an example, the eNB 830 may be equipped with a module that includes part (e.g., the BB processor 856) or whole of the wireless communication interface 855 and/or the controller 851 so that one or more of the above components are implemented in the module in question. In this case, the above module may store a program for causing the processor to function as one or more of the above components (i.e., a program for causing the processor to perform the operation of one or more of the above components) and execute the program in question. As another example, a program for causing the processor to function as one or more of the above components may be installed to the eNB 830 so that the wireless communication interface 855 (e.g., the BB processor 856) and/or the controller 851 executes the program in question. As described above, the eNB 830, the base station apparatus 850, or the above module may be provided as an apparatus including one or more of the above components, and a program for causing the processor to function as one or more of the above components may be provided. Also, a readable recording medium having the above program recorded therein may be provided.

Also, in the eNB 830 illustrated in FIG. 15, the wireless communication section 120 described with reference to FIG. 4 may be implemented in the wireless communication interface 863 (e.g., the RF circuits 864). Also, the antenna section 110 may be implemented in the antennas 840. Also, the network communication section 130 may be implemented in the controller 851 and/or the network interface 853. Also, the storage section 140 may be implemented in the memory 852.

4.2. Application Examples Related to Terminal Apparatus

First Application Example

Figure 16:
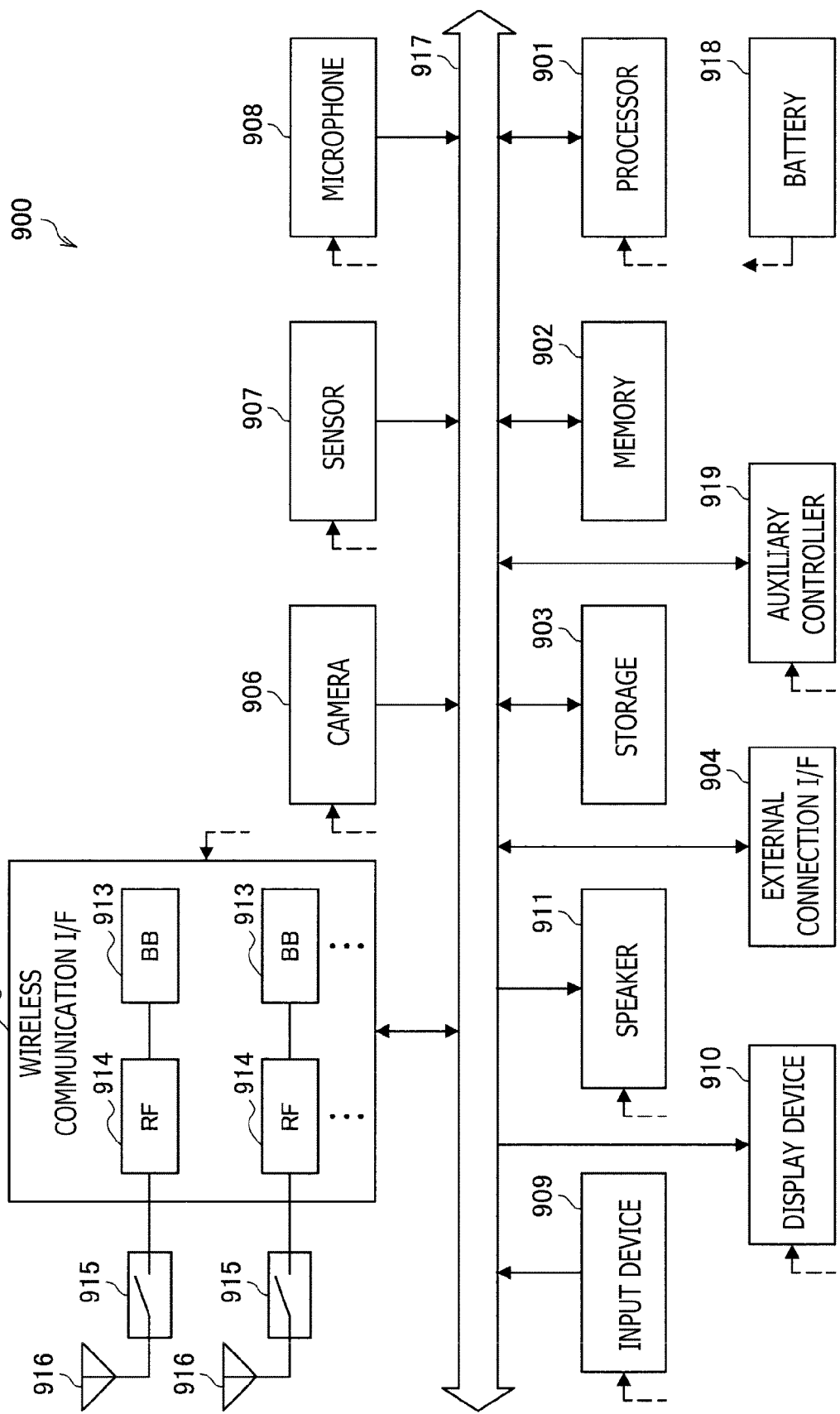
FIG. 16 is a block diagram illustrating an example of a schematic configuration of a smartphone.

FIG. 16 is a block diagram illustrating an example of a schematic configuration of a smartphone 900 to which the technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a SoC (System on Chip) and controls the functions of the application layer and other layers of the smartphone 900. The memory 902 includes a RAM and a ROM and stores a program executed by the processor 901 and data. The storage 903 can include storage media such as semiconductor memory and hard disk. The external connection interface 904 is an interface for connecting an external device such as memory card or USB (Universal Serial Bus) device to the smartphone 900.

The camera 906 has an imaging element such as CCD (Charge Coupled Device) or CMOS (Complementary Metal Oxide Semiconductor) and generates a captured image. The sensor 907 can include a group of sensors such as positioning sensor, gyro sensor, geomagnetic sensor, and acceleration sensor. The microphone 908 converts audio input from the smartphone 900 into an audio signal. The input device 909 includes, for example, a touch sensor that detects touch on a screen of the display device 910, a keypad, a keyboard, buttons, switches, and so on and accepts user operation or information input. The display device 910 has a liquid crystal display (LCD), organic light-emitting diode (OLED) display, or other type of screen and displays an output image of the smartphone 900. The speaker 911 converts the audio signal output from the smartphone 900 into audio.

The wireless communication interface 912 supports a cellular communication scheme such as LTE or LTE-Advanced and carries out wireless communication. The wireless communication interface 912 can typically include a BB processor 913, an RF circuit 914, and so on. The BB processor 913 may perform, for example, coding/decoding, modulation/demodulation, multiplexing/demultiplexing, and other tasks and carry out various signal processing tasks for wireless communication. On the other hand, the RF circuit 914 may include a mixer, a filter, an amplifier, and so on and send and receive wireless signals via the antennas 916. The wireless communication interface 912 may be a one-chip module that has the BB processors 913 and the RF circuits 914 integrated therein. The wireless communication interface 912 may include the plurality of BB processors 913 and the plurality of RF circuits 914 as illustrated in FIG. 16. It should be noted that although FIG. 16 depicts an example in which the wireless communication interface 912 includes the plurality of BB processors 913 and the plurality of RF circuits 914, the wireless communication interface 912 may include only one BB processor 913 or only one RF circuit 914.

Further, the wireless communication interface 912 may support, in addition to a cellular communication scheme, other type of wireless communication scheme such as short-range wireless communication scheme, proximity wireless communication scheme, or wireless LAN (Local Area Network) scheme, and in that case, the wireless communication interface 912 may include the BB processor 913 and the RF circuit 914 for each wireless communication scheme.

Each of the antenna switches 915 switches a connection destination of the antenna 916 between a plurality of circuits (e.g., circuits for different wireless communication schemes) included in the wireless communication interface 912.

Each of the antennas 916 has one or a plurality of antenna elements (e.g., a plurality of antenna elements included in a MIMO antenna) and is used for transmission and reception of wireless signals by the wireless communication interface 912. The smartphone 900 may have the plurality of antennas 916 as illustrated in FIG. 16. It should be noted that although FIG. 16 depicts an example in which the smartphone 900 has the plurality of antennas 916, the smartphone 900 may have only one antenna 916.

Further, the smartphone 900 may include the antenna 916 for each wireless communication scheme. In that case, the antenna switches 915 may be omitted from the configuration of the smartphone 900.

The bus 917 connects, to each other, the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies power to each block of the smartphone 900 illustrated in FIG. 16 via a power feed line partially represented by a broken line. The auxiliary controller 919 activates the minimum required functions of the smartphone 900 in sleep mode, for example.

In the smartphone 900 illustrated in FIG. 16, one or more components (the setting section 241 and/or the communication processing section 243) included in the terminal apparatus 200 described with reference to FIG. 5 may be implemented in the wireless communication interface 912. Alternatively, at least some of these components may be implemented in the auxiliary controller 919. As an example, the smartphone 900 may be equipped with a module that includes part (e.g., the BB processor 913) or whole of the wireless communication interface 912, the processor 901, and/or the auxiliary controller 919 so that one or more of the above components are implemented in the module in question. In this case, the above module may store a program for causing the processor to function as one or more of the above components (in other words, a program for causing the processor to perform the operation of one or more of the above components) and execute the program in question. As another example, a program for causing the processor to function as one or more of the above components may be installed to the smartphone 900 so that the wireless communication interface 912 (e.g., the BB processor 913), the processor 901, and/or the auxiliary controller 919 executes the program in question. As described above, the smartphone 900 or the above module may be provided as an apparatus including one or more of the above components, and a program for causing the processor to function as one or more of the above components may be provided. Also, a readable recording medium having the above program recorded therein may be provided.

Also, in the smartphone 900 illustrated in FIG. 16, for example, the wireless communication section 220 described with reference to FIG. 5 may be implemented in the wireless communication interface 912 (e.g., the RF circuit 914). Also, the antenna section 210 may be implemented in the antenna 916. Also, the storage section 230 may be implemented in the memory 902.

Second Application Example

Figure 17:
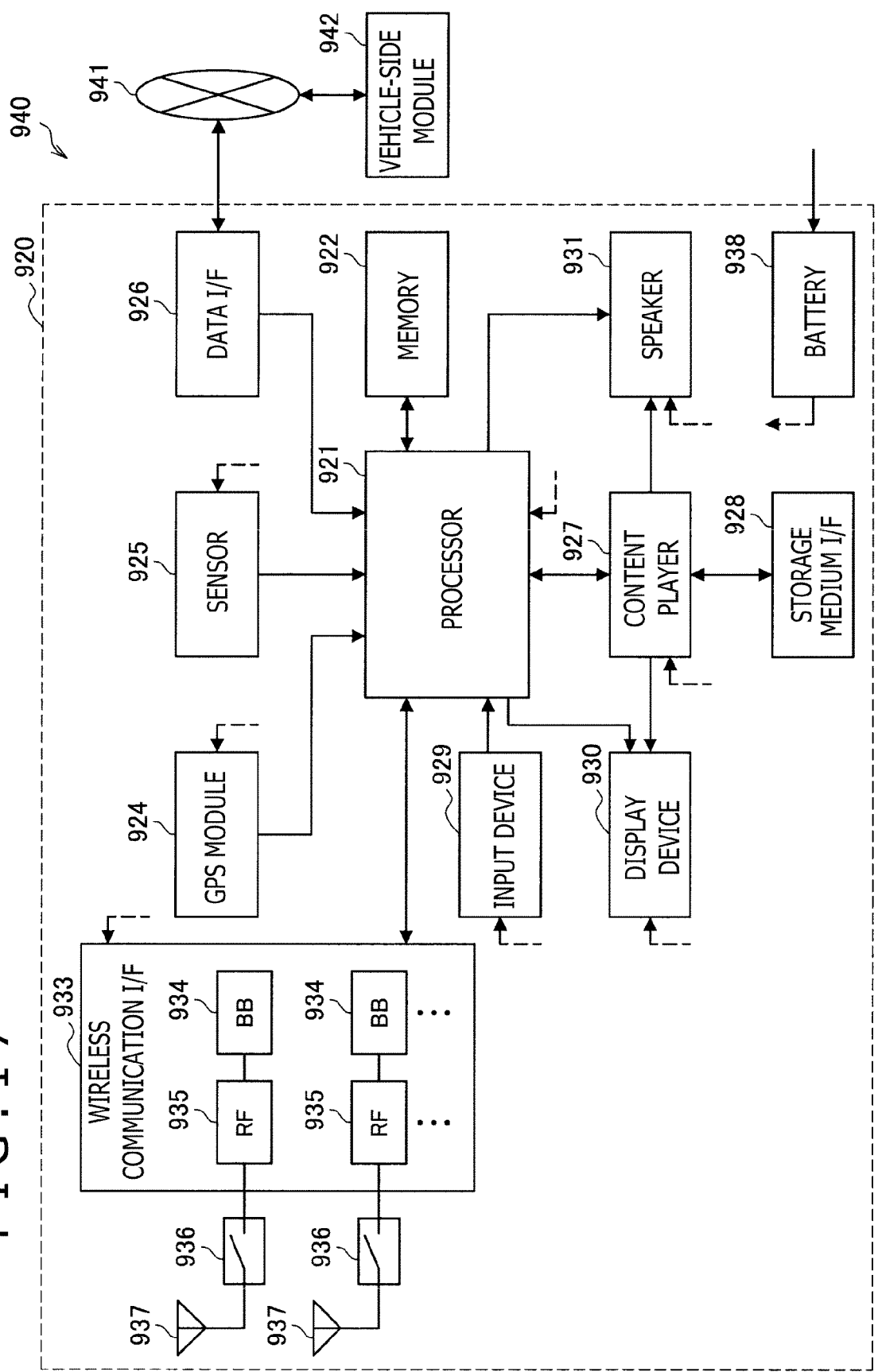
FIG. 17 is a block diagram illustrating an example of a schematic configuration of a car navigation apparatus.

FIG. 17 is a block diagram illustrating an example of a schematic configuration of a car navigation apparatus 920 to which the technology according to the present disclosure is applicable. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC and controls navigation and other functions of the car navigation apparatus 920. The memory 922 includes a RAM and a ROM and stores a program executed by the processor 921 and data.

The GPS module 924 measures positions (e.g., longitude, latitude, and height) of the car navigation apparatus 920 by using GPS signals received from GPS satellites. The sensor 925 can include, for example, a group of sensors such as gyro sensor, geomagnetic sensor, and atmospheric pressure sensor. The data interface 926 is connected, for example, to a vehicle-mounted network 941 via a terminal that is not depicted and acquires data generated on a vehicle side such as vehicle speed data.

The content player 927 reproduces content stored in a storage medium (e.g., CD or DVD) inserted into the storage medium interface 928. The input device 929 includes, for example, a touch sensor that detects touch on the screen of the display device 930, buttons, switches, or other device and accepts user operation or information input. The display device 930 has an LCD, an OLED display, or other type of screen and displays an image of the navigation function or reproduced content. The speaker 931 outputs audio of the navigation function or reproduced content.

The wireless communication interface 933 supports a cellular communication scheme such as LTE or LTE-Advanced and carries out wireless communication. The wireless communication interface 933 can typically include a BB processor 934, an RF circuit 935, and so on. The BB processor 934 may perform, for example, coding/decoding, modulation/demodulation, multiplexing/demultiplexing, and other tasks and carry out various signal processing tasks for wireless communication. On the other hand, the RF circuit 935 may include a mixer, a filter, an amplifier, and so on and send and receive wireless signals via the antennas 937. The wireless communication interface 933 may be a one-chip module that has the BB processor 934 and the RF circuit 935 integrated therein. The wireless communication interface 933 may include the plurality of BB processors 934 and the plurality of RF circuits 935 as illustrated in FIG. 17. It should be noted that although FIG. 17 depicts an example in which the wireless communication interface 933 includes the plurality of BB processors 934 and the plurality of RF circuits 935, the wireless communication interface 933 may include only one BB processor 934 or only one RF circuit 935.

Further, the wireless communication interface 933 may support, in addition to a cellular communication scheme, other type of wireless communication scheme such as short-range wireless communication scheme, proximity wireless communication scheme, or wireless LAN scheme, and in that case, the wireless communication interface 933 may include the BB processor 934 and the RF circuit 935 for each wireless communication scheme.

Each of the antenna switches 936 switches a connection destination of the antenna 937 between a plurality of circuits (e.g., circuits for different wireless communication schemes) included in the wireless communication interface 933.

Each of the antennas 937 has one or a plurality of antenna elements (e.g., a plurality of antenna elements included in a MIMO antenna) and is used for transmission and reception of wireless signals by the wireless communication interface 933. The car navigation apparatus 920 may have the plurality of antennas 937 as illustrated in FIG. 17. It should be noted that although FIG. 17 depicts an example in which the car navigation apparatus 920 has the plurality of antennas 937, the car navigation apparatus 920 may have only one antenna 937.

Further, the car navigation apparatus 920 may include the antenna 937 for each wireless communication scheme. In that case, the antenna switches 936 may be omitted from the configuration of the car navigation apparatus 920.

The battery 938 supplies power to each block of the car navigation apparatus 920 illustrated in FIG. 17 via a power feed line partially represented by a broken line. Also, the battery 938 accumulates power fed from the vehicle side.

In the car navigation apparatus 920 illustrated in FIG. 17, one or more components (the setting section 241 and/or the communication processing section 243) included in the terminal apparatus 200 described with reference to FIG. 5 may be implemented in the wireless communication interface 933. Alternatively, at least some of these components may be implemented in the processor 921. As an example, the car navigation apparatus 920 may be equipped with a module that includes part (e.g., the BB processor 934) or whole of the wireless communication interface 933 and/or the processor 921 so that one or more of the above components are implemented in the module in question. In this case, the above module may store a program for causing the processor to function as one or more of the above components (in other words, a program for causing the processor to perform the operation of one or more of the above components) and execute the program in question. As another example, a program for causing the processor to function as one or more of the above components may be installed to the car navigation apparatus 920 so that the wireless communication interface 933 (e.g., the BB processor 934) and/or the processor 921 executes the program in question. As described above, the car navigation apparatus 920 or the above module may be provided as an apparatus including one or more of the above components, and a program for causing the processor to function as one or more of the above components may be provided. Also, a readable recording medium having the above program recorded therein may be provided.

In the car navigation apparatus 920 illustrated in FIG. 17, for example, the wireless communication section 220 described with reference to FIG. 5 may be implemented in the wireless communication interface 933 (e.g., the RF circuit 935). Also, the antenna section 210 may be implemented in the antenna 937. Also, the storage section 230 may be implemented in the memory 922.

Also, the technology according to the present disclosure may be realized as a vehicle-mounted system (or vehicle) 940 that includes one or more blocks of the car navigation apparatus 920 described above, the vehicle-mounted network 941, and a vehicle-side module 942. The vehicle-side module 942 generates vehicle-side data such as vehicle speed, engine revolutions per minute (RPM), failure information, and so on and outputs the data to the vehicle-mounted network 941.

5. Conclusion

A detailed description of an embodiment of the present disclosure has been given above with reference to FIGS. 1 to 17. As described above, the transmission apparatus according to the present embodiment (the terminal apparatus 200 in uplink transmission) performs settings regarding a resource capable of grant-free transmission and a plurality of transmission patterns corresponding to predetermined pieces of information different from each other. Then, the transmission apparatus sends data in a grant-free manner in the resource capable of grant-free transmission by using the transmission pattern selected from among the plurality of transmission patterns. On the other hand, the reception apparatus according to the present embodiment (base station apparatus 100 in uplink transmission) performs settings regarding a resource capable of grant-free transmission that can be used by the transmission apparatus and a plurality of transmission patterns corresponding to predetermined pieces of information different from each other. Then, the reception apparatus acquires data sent by the transmission apparatus in a grant-free manner in the resource capable of grant-free transmission and the predetermined piece of information corresponding to the transmission pattern used for the data in question selected from among the plurality of transmission patterns. The transmission apparatus according to the present embodiment can flexibly select a transmission pattern to be used for data transmission from among the plurality of patterns in accordance with the interference condition and so on, thus ensuring improved transmission efficiency of the system as a whole. Further, thanks to the selection of a transmission pattern, information corresponding to the selected transmission pattern is notified to the reception apparatus from the transmission apparatus indirectly, i.e., without consuming any physical resource, thus ensuring improved transmission efficiency.

Although a detailed description has been given above of a preferred embodiment of the present disclosure with reference to the attached drawings, the technical scope of the present disclosure is not limited to such an example. It is apparent to those having ordinary skill in the technical field of the present disclosure to be able to conceive of various alteration examples or modification examples within the scope of the technical idea recited in the claims, and these are also naturally construed as falling within the technical scope of the present disclosure.

Also, the processing described using the flowcharts and the sequence diagrams need not necessarily be performed in the orders illustrated. Several processing steps may be performed in parallel. Also, additional processing steps may be adopted, and some processing steps may be omitted.

Also, the effects recited in the present specification are merely descriptive or illustrative and not restrictive. That is, the technology according to the present disclosure can achieve, together with or in place of the above effects, other effects apparent to those skilled in the art from the description of the present specification.

It should be noted that the following configurations also fall within the technical scope of the present disclosure:

(1)
A transmission apparatus including:
a setting section adapted to perform settings regarding a resource capable of grant-free transmission and a plurality of transmission patterns corresponding to predetermined pieces of information different from each other; and
a communication processing section adapted to send data in a grant-free manner in the resource capable of grant-free transmission by using a transmission pattern selected from among the plurality of transmission patterns.

(2)
The transmission apparatus of feature (1), in which
the transmission pattern relates to a non-orthogonal resource used for the data transmission.

(3)
The transmission apparatus of feature (1) or (2), in which
the transmission pattern relates to an orthogonal resource used for the data transmission.

(4)
The transmission apparatus of any one of features (1) to (3), in which
the transmission pattern relates to a reference signal for demodulation of the data.

(5)
The transmission apparatus of any one of features (1) to (4), in which
the transmission pattern relates to scrambling of the data.

(6)
The transmission apparatus of any one of features (1) to (5), in which
the transmission pattern relates to a beam for the data.

(7)
The transmission apparatus of any one of features (1) to (6), in which
the predetermined information includes information for processing of receiving the data.

(8)
The transmission apparatus of feature (7), in which
the predetermined information includes the number of transmissions of the data in retransmission control.

(9)
The transmission apparatus of feature (8), in which
in a case where the number of transmissions of the data in retransmission control exceeds a predetermined threshold, a predetermined transmission pattern is used.

(10)
The transmission apparatus of feature (8), in which
two transmission patterns are included in the plurality of transmission patterns, and a first transmission pattern indicates initial transmission, and a second transmission pattern indicates retransmission.

The transmission apparatus of feature (7), in which
the predetermined information includes the number of transmissions of the data in repeated transmission.

(12)

The transmission apparatus of feature (11), in which
in a case where the repeated transmission halts before a set maximum number of repeated transmissions is reached, the transmission pattern corresponding to the maximum number of repeated transmissions is used for the data sent at a last session of the repeated transmission.

(13)

The transmission apparatus of feature (7), in which
the predetermined information includes a process number of the data in retransmission control.

(14)

The transmission apparatus of any one of features (7) to (13), in which
the predetermined information includes a transmission parameter used for the data.

(15)

A reception apparatus including:
a setting section adapted to perform settings regarding a resource capable of grant-free transmission that is capable of being used by a transmission apparatus and a plurality of transmission patterns corresponding to predetermined pieces of information different from each other; and
a communication processing section adapted to acquire data sent by the transmission apparatus in a grant-free manner in the resource capable of grant-free transmission and a predetermined piece of information corresponding to a transmission pattern used for the data selected from among the plurality of transmission patterns.

(16)

A transmission method carried out by a processor, the transmission method including:
settings performed regarding a resource capable of grant-free transmission and a plurality of transmission patterns corresponding to predetermined pieces of information different from each other; and
grant-free transmission of data in the resource capable of grant-free transmission by using a transmission pattern selected from among the plurality of transmission patterns.

(17)

A reception method carried out by a processor, the reception method including:
settings performed regarding a resource capable of grant-free transmission that is capable of being used by a transmission apparatus and a plurality of transmission patterns corresponding to predetermined pieces of information different from each other; and
acquisition of data sent by the transmission apparatus in a grant-free manner in the resource capable of grant-free transmission and a predetermined piece of information corresponding to a transmission pattern used for the data selected from among the plurality of transmission patterns.

(18)

A recording medium having a program recorded therein, the program causing a computer to function as:
a setting section adapted to perform settings regarding a resource capable of grant-free transmission and a plurality of transmission patterns corresponding to predetermined pieces of information different from each other; and
a communication processing section adapted to send data in a grant-free manner in the resource capable of grant-free transmission by using a transmission pattern selected from among the plurality of transmission patterns.

(19)

A recording medium having a program recorded therein, the program causing a computer to function as:
a setting section adapted to perform settings regarding a resource capable of grant-free transmission that is capable of being used by a transmission apparatus and a plurality of transmission patterns corresponding to predetermined pieces of information different from each other; and
a communication processing section adapted to acquire data sent by the transmission apparatus in a grant-free manner in the resource capable of grant-free transmission and a predetermined piece of information corresponding to a transmission pattern used for the data selected from among the plurality of transmission patterns.

REFERENCE SIGNS LIST

1 System
11 Cell
20 Core network
30 PDN
100 Base station apparatus
110 Antenna section
120 Wireless communication section
130 Network communication section
140 Storage section
150 Control section
151 Setting section
153 Communication processing section
200 Terminal apparatus
210 Antenna section
220 Wireless communication section
230 Storage section
240 Control section
241 Setting section
243 Communication processing section

The invention claimed is:

1. A transmission apparatus comprising:
a transceiver; and
a hardware processor configured to:
perform settings regarding a resource capable of grant-free transmission and a plurality of transmission patterns, each of the plurality of transmission patterns corresponding to different predetermined information; and
send data in a grant-free manner in the resource capable of grant-free transmission by using a transmission pattern selected from among the plurality of transmission patterns,
wherein the predetermined information is information regarding retransmission control for the data,
wherein the predetermined information includes the number of transmissions of the data in retransmission control, and
wherein, in a case where the number of transmissions of the data in retransmission control exceeds a predetermined threshold, a predetermined transmission pattern is used.

2. The transmission apparatus of claim 1, wherein the transmission pattern relates to a non-orthogonal resource used for the data transmission.

3. The transmission apparatus of claim 1, wherein the transmission pattern relates to an orthogonal resource used for the data transmission.

4. The transmission apparatus of claim 1, wherein the transmission pattern relates to a reference signal for demodulation of the data.

5. The transmission apparatus of claim 1, wherein the transmission pattern relates to scrambling of the data.

6. The transmission apparatus of claim 1, wherein the transmission pattern relates to a beam for the data.

7. The transmission apparatus of claim 1, wherein two transmission patterns are included in the plurality of transmission patterns, and a first transmission pattern indicates initial transmission, and a second transmission pattern indicates retransmission.

8. The transmission apparatus of claim 1, wherein the predetermined information includes a process number of the data in retransmission control.

9. The transmission apparatus of claim 1, wherein the predetermined information includes a transmission parameter used for the data.

10. A transmission apparatus comprising:
a transceiver; and
a hardware processor configured to:
perform settings regarding a resource capable of grant-free transmission and a plurality of transmission patterns, each of the plurality of transmission patterns corresponding to different predetermined information; and
send data in a grant-free manner in the resource capable of grant-free transmission by using a transmission pattern selected from among the plurality of transmission patterns,
wherein the predetermined information is information regarding retransmission control for the data,
wherein the predetermined information includes the number of transmissions of the data in repeated transmission, and
wherein in a case where the repeated transmission halts before a set maximum number of repeated transmissions is reached, the transmission pattern corresponding to the maximum number of repeated transmissions is used for the data sent at a last session of the repeated transmission.

11. A reception apparatus comprising:
a transceiver; and
a hardware processor configured to:
perform settings regarding a resource capable of grant-free transmission that is capable of being used by a transmission apparatus and a plurality of transmission patterns, each of the plurality of transmission patterns corresponding to different predetermined information; and
acquire data sent by the transmission apparatus in a grant-free manner in the resource capable of grant-free transmission and a predetermined piece of information corresponding to a transmission pattern used for the data selected from among the plurality of transmission patterns,
wherein the predetermined information is information regarding retransmission control for the data,
wherein the predetermined information includes the number of transmissions of the data in retransmission control, and
wherein, in a case where the number of transmissions of the data in retransmission control exceeds a predetermined threshold, a predetermined transmission pattern is used.

12. A transmission method carried out by a processor, the transmission method comprising:
setting a resource capable of grant-free transmission and a plurality of transmission patterns, each of the plurality of transmission patterns corresponding to different predetermined information; and
performing grant-free transmission of data in the resource capable of grant-free transmission by using a transmission pattern selected from among the plurality of transmission patterns,
wherein the predetermined information is information regarding retransmission control for the data,
wherein the predetermined information includes the number of transmissions of the data in retransmission control, and
wherein, in a case where the number of transmissions of the data in retransmission control exceeds a predetermined threshold, a predetermined transmission pattern is used.

13. A reception method carried out by a processor, the reception method comprising:
setting a resource capable of grant-free transmission that is capable of being used by a transmission apparatus and a plurality of transmission patterns, each of the plurality of transmission patterns corresponding to different predetermined information; and
acquiring data sent by the transmission apparatus in a grant-free manner in the resource capable of grant-free transmission and a predetermined piece of information corresponding to a transmission pattern used for the data selected from among the plurality of transmission patterns,
wherein the predetermined information is information regarding retransmission control for the data,
wherein the predetermined information includes the number of transmissions of the data in retransmission control, and
wherein, in a case where the number of transmissions of the data in retransmission control exceeds a predetermined threshold, a predetermined transmission pattern is used.

14. A non-transitory recording medium having a program recorded therein, the program executed by a processor and causing a computer to perform:
setting a resource capable of grant-free transmission and a plurality of transmission patterns, each of the plurality of transmission patterns corresponding to different predetermined information; and
sending data in a grant-free manner in the resource capable of grant-free transmission by using a transmission pattern selected from among the plurality of transmission patterns,
wherein the predetermined information is information regarding retransmission control for the data,
wherein the predetermined information includes the number of transmissions of the data in retransmission control, and
wherein, in a case where the number of transmissions of the data in retransmission control exceeds a predetermined threshold, a predetermined transmission pattern is used.

15. A non-transitory recording medium having a program recorded therein, the program executed by a processor and causing a computer to perform:
setting a resource capable of grant-free transmission that is capable of being used by a transmission apparatus and a plurality of transmission patterns, each of the plurality of transmission patterns corresponding to different predetermined information; and
acquiring data sent by the transmission apparatus in a grant-free manner in the resource capable of grant-free transmission and a predetermined piece of information corresponding to a transmission pattern used for the data selected from among the plurality of transmission patterns, wherein the predetermined information is information regarding retransmission control for the data, wherein the predetermined information includes the number of transmissions of the data in retransmission control, and wherein, in a case where the number of transmissions of the data in retransmission control exceeds a predetermined threshold, a predetermined transmission pattern is used.

* * * * *